(12) United States Patent
Tarao et al.

(10) Patent No.: US 11,173,349 B2
(45) Date of Patent: Nov. 16, 2021

(54) GOLF BALL

(71) Applicant: Sumitomo Rubber Industries, Ltd., Kobe (JP)

(72) Inventors: Toshiyuki Tarao, Kobe (JP); Mami Tanaka, Kobe (JP); Hidetaka Inoue, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/203,192

(22) Filed: Nov. 28, 2018

(65) Prior Publication Data
US 2019/0160341 A1 May 30, 2019

(30) Foreign Application Priority Data

Nov. 29, 2017 (JP) .............................. JP2017-229721
Nov. 29, 2017 (JP) .............................. JP2017-229722
Sep. 26, 2018 (JP) .............................. JP2018-180087

(51) Int. Cl.
*A63B 37/06* (2006.01)
*A63B 37/00* (2006.01)
(Continued)

(52) U.S. Cl.
CPC ........ *A63B 37/0022* (2013.01); *A63B 37/008* (2013.01); *A63B 37/0031* (2013.01);
(Continued)

(58) Field of Classification Search
CPC ................................................. A63B 37/0022
(Continued)

(56) References Cited

U.S. PATENT DOCUMENTS 6,454,667 B1   9/2002   Iwami
2003/0176242 A1   9/2003   Mano
(Continued)

FOREIGN PATENT DOCUMENTS

JP   2000-288125 A   10/2000
JP   2003-265650 A   9/2003
(Continued)

OTHER PUBLICATIONS

Extended European Search Report dated Apr. 5, 2019, in European Patent Application No. 18206094.7.

*Primary Examiner* — Raeann Gorden
(74) *Attorney, Agent, or Firm* — Birch, Stewart, Kolasch & Birch LLP

(57) ABSTRACT

An object of the present invention is to provide a golf ball travelling a great flight distance on driver shots, having enhanced controllability on approach shots under a wet condition, and being excellent in stain resistance and shot feeling. The present invention provides a golf ball comprising a golf ball body having a cover, and a paint film covering the golf ball body, wherein a 10% elastic modulus of the paint film is 75 kgf/cm$^2$ or less, a storage modulus ($E'_{150}$) at 150° C. of the paint film obtained by measuring dynamic viscoelasticity of the paint film is $1.0 \times 10^7$ Pa or more, an indentation depth of the paint film measured with a nanoindenter in a state that the paint film is formed on the surface of the golf ball body is 1250 nm or more, and a material hardness of the cover is 50 or more in Shore D hardness.

22 Claims, 7 Drawing Sheets

(51) Int. Cl.
*C09D 175/04* (2006.01)
*C08G 18/79* (2006.01)
*C08G 18/62* (2006.01)
*C08G 18/40* (2006.01)
*C08G 18/72* (2006.01)
*C08G 18/24* (2006.01)
*C08G 18/42* (2006.01)
*C08G 18/64* (2006.01)
*C08G 18/78* (2006.01)

(52) U.S. Cl.
CPC ...... *A63B 37/0033* (2013.01); *A63B 37/0087* (2013.01); *C08G 18/246* (2013.01); *C08G 18/4063* (2013.01); *C08G 18/4081* (2013.01); *C08G 18/4277* (2013.01); *C08G 18/6275* (2013.01); *C08G 18/6484* (2013.01); *C08G 18/725* (2013.01); *C08G 18/7831* (2013.01); *C08G 18/792* (2013.01); *C09D 175/04* (2013.01); *A63B 37/0075* (2013.01)

(58) Field of Classification Search
USPC .......................................................... 473/378
See application file for complete search history.

(56) References Cited

U.S. PATENT DOCUMENTS

| | | | |
|---|---|---|---|
| 2010/0179001 A1* | 7/2010 | Cheng | A63B 37/0003 473/374 |
| 2011/0053708 A1 | 3/2011 | Isoagawa et al. | |
| 2011/0244989 A1 | 10/2011 | Tarao et al. | |
| 2013/0331205 A1 | 12/2013 | Tarao et al. | |
| 2016/0136484 A1* | 5/2016 | Inoue | A63B 37/0022 473/377 |
| 2018/0178071 A1* | 6/2018 | Kamino | C08G 18/4854 |

FOREIGN PATENT DOCUMENTS

| | | | |
|---|---|---|---|
| JP | 2006-75209 A | | 3/2006 |
| JP | 2006-75210 A | | 3/2006 |
| JP | 2011-67595 A | | 4/2011 |
| JP | 2011-217820 A | | 11/2011 |
| JP | 2014-14383 A | | 1/2014 |
| JP | 2014-14384 A | | 1/2014 |
| JP | 2014-014386 | * | 1/2014 |
| JP | 2014-14386 A | | 1/2014 |

* cited by examiner

Paint No. 1

GOLF BALL

FIELD OF THE INVENTION

The present invention relates to a technology for improving spin performance of a golf ball.

DESCRIPTION OF THE RELATED ART

A paint film is formed on a surface of a golf ball body. It has been proposed to improve properties of a golf ball by improving the paint film thereof. Japanese Patent Publication No. 2011-67595 A discloses a golf ball comprising a core, a cover disposed on an outer side of the core, and a paint layer disposed on an outer side of the cover, wherein the cover has a Shore D hardness of 61 or less, and the paint layer has a martens hardness of 2.0 mgf/µm² or less. The golf ball disclosed in Japanese Patent Publication No. 2011-67595 A is excellent in spin performance, spin rate stability and paint layer durability.

Japanese Patent Publication No. 2011-217820 A discloses a golf ball comprising a golf ball body and a paint film formed on a surface of the golf ball body, wherein the paint film has a martens hardness of 2.0 mgf/µm² or less, and a ratio (50% elastic modulus/10% elastic modulus) of 50% elastic modulus to 10% elastic modulus is 1.6 or more. The golf ball disclosed in Japanese Patent Publication No. 2011-217820 A has a high spin rate on approach shots under a wet condition and a rough condition.

Japanese Patent Publications No. 2006-75209 A and No. 2006-75210 A have proposed a golf ball stopping quickly with an increased launch angle. Japanese Patent Publication No. 2006-75209 A discloses a golf ball comprising a golf ball body and a paint layer covering a surface of the golf ball body, wherein a resin component constituting the paint layer is cured by a polyimide based curing agent, and the golf ball has a static coefficient of friction of 0.22 or less. Japanese Patent Publication No. 2006-75210 A discloses a golf ball comprising a golf ball body and a paint film covering the golf ball body, wherein the paint film contains metal particles.

Japanese Patent Publication No. 2000-288125 A has proposed a golf ball showing improved durability and abrasion resistance. The golf ball showing excellent durability comprises a core, a cover and at least one paint layer formed on the cover, wherein the cover has a Shore D hardness ranging from 50 to 65 and a bending flexural modulus ranging from 1,000 to 2,000 kgf/cm², and at least an outermost layer of the paint has a 10% elastic modulus ranging from 5 to 50 kgf/cm².

Japanese Patent Publication No. 2003-265650 A has proposed a golf ball showing improved spin retention ratio without sacrificing the properties required for a paint film. Japanese Patent Publication No. 2003-265650 A discloses a golf ball comprising a core, at least one cover layer covering the core and a paint film formed on an outer surface of the cover, wherein the paint film has a thickness falling within a range of 25 µm or more and 125 µm or less and a 50% elastic modulus falling within a range of 5 MPa or more and 50 MPa or less, and R expressed by a following equation (1) falls within a range of 0.01 or more and 0.5 or less, when CL (mm) represents a thickness of an outermost layer of the cover, and PL (µm) represents the thickness of the paint film;

$$R = PL/CL/1{,}000 \qquad (1).$$

Japanese Patent Publication No. 2014-14383 A has proposed a golf ball having high controllability on approach shots for less than 40 yards, a decreased spin rate on driver shots, and an excellent shot feeling. Japanese Patent Publication No. 2014-14383 A discloses a golf ball comprising a golf ball body and a paint film formed on a surface of the golf ball body, wherein the paint film has a storage modulus (E') of $1.00 \times 10^7$ dyn/cm² or more and $1.00 \times 10^8$ dyn/cm² or less in a temperature range from 120° C. to 150° C., and a loss tangent (tan δ) of 0.050 or more at 10° C., measured with a dynamic viscoelasticity measuring apparatus under the following measuring condition:

Measuring mode: tensile mode
Measuring temperature: from −50° C. to 150° C.
Temperature rising rate: 4° C./min
Oscillation frequency: 10 Hz
Measuring strain: 0.1%.

SUMMARY OF THE INVENTION

It goes without saying that not only the flight distance on driver shots but also the precision on approach shots are important in making a good score when playing golf. Japanese Patent Publication No. 2014-14383 A has proposed a golf ball having enhanced controllability on approach shots of less than 40 yards, in particular, on approach shots of about 10 yards to 20 yards from around the green under a dry condition. However, for example, enhancement in the spin rate on approach shots under a wet condition and in the spin rate on approach shots from the rough was not discussed.

In particular, the golf ball having a cover with a high hardness for a purpose of increasing the flight distance on driver shots tends to have a lowered spin rate on approach shots under a wet condition.

The golf ball having a large compression deformation amount for a purpose of increasing the shot feeling on driver shots particularly tends to have a lowered spin rate on approach shots from the rough.

If the paint film is softened for a purpose of increasing the spin rate on approach shots, there was a problem that the paint film is easily stained by grass juice, muddy water or the like.

In one aspect of the present invention, an object of the present invention is to provide a golf ball traveling a great flight distance on driver shots, having high controllability on approach shots under a wet condition and being excellent in stain resistance and shot feeling.

In another aspect of the present invention, an object of the present invention is to provide a golf ball having a good shot feeling on driver shots, having high controllability on approach shots from the rough and being excellent in stain resistance and shot feeling.

In a preferable embodiment, the present invention provides a golf ball comprising a golf ball body having a cover, and a paint film covering the golf ball body, wherein a 10% elastic modulus of the paint film is 75 kgf/cm² or less, a storage modulus ($E'_{150}$) at 150° C. of the paint film obtained by measuring dynamic viscoelasticity of the paint film is $1.0 \times 10^7$ Pa or more, an indentation depth of the paint film measured with a nanoindenter in a state that the paint film is formed on the surface of the golf ball body is 1250 nm or more, and a material hardness of the cover is 50 or more in Shore D hardness.

In another preferable embodiment, the present invention provides a golf ball comprising a golf ball body and a paint film covering the golf ball body, wherein a 10% elastic modulus of the paint film is 75 kgf/cm² or less, a storage modulus ($E'_{150}$) at 150° C. of the paint film obtained by measuring dynamic viscoelasticities of the paint film is $1.0 \times 10^7$ Pa or more, an indentation depth of the paint film measured with a nanoindenter in a state that the paint film is formed on the surface of the golf ball body is 1250 nm or more, a diameter of the golf ball ranges from 40 mm to 45 mm, and a compression deformation amount of the golf ball when applying a load from 98 N as an initial load to 1275 N as a final load to the golf ball is more than 3.0 mm.

According to the preferable embodiment of the present invention, a golf ball traveling a great flight distance on driver shots, having high controllability on approach shots under a wet condition and being excellent in stain resistance and shot feeling is obtained.

According to another preferable embodiment of the present invention, a golf ball having a good shot feeling on driver shots, having high controllability on approach shots from the rough and being excellent in stain resistance and shot feeling is obtained.

DESCRIPTION OF THE PREFERRED EMBODIMENT

Figure 1:
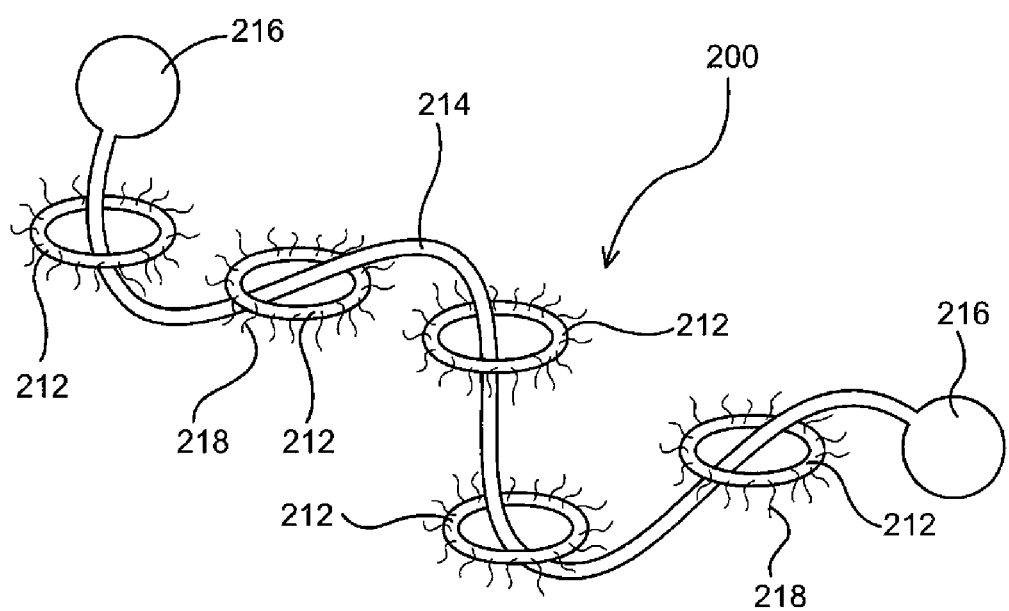
FIG. 1 is an explanatory drawing illustrating a molecular structure of one example of a polyrotaxane used in the present invention.

In a preferable embodiment, the present invention provides a golf ball comprising a golf ball body having a cover, and a paint film covering the golf ball body, wherein a 10% elastic modulus of the paint film is 75 kgf/cm² or less, a storage modulus ($E'_{150}$) at 150° C. of the paint film obtained by measuring dynamic viscoelasticity of the paint film is $1.0 \times 10^7$ Pa or more, an indentation depth of the paint film measured with a nanoindenter in a state that the paint film is formed on the surface of the golf ball body is 1250 nm or more, and a material hardness of the cover is 50 or more in Shore D hardness.

In another preferable embodiment, the present invention provides a golf ball comprising a golf ball body and a paint film covering the golf ball body, wherein a 10% elastic modulus of the paint film is 75 kgf/cm² or less, a storage modulus ($E'_{150}$) at 150° C. of the paint film obtained by measuring dynamic viscoelasticity of the paint film is $1.0 \times 10^7$ Pa or more, an indentation depth of the paint film measured with a nanoindenter in a state that the paint film is formed on the surface of the golf ball body is 1250 nm or more, a diameter of the golf ball ranges from 40 mm to 45 mm, and a compression deformation amount of the golf ball when applying a load from 98 N as an initial load to 1275 N as a final load to the golf ball is more than 3.0 mm.

The inventors of the present invention have found that when measuring the change of the storage modulus (E') of the paint film depending on the temperature with a dynamic viscoelasticity measuring apparatus, even if the paint film nearly has no difference in the storage modulus (E') in the low temperature region, the paint film has difference in the storage modulus in the high temperature region of 120° C. to 150° C., and the storage modulus (E') in this temperature range of 120° C. to 150° C. affects the spin performance on approach shots of less than 40 yards.

In the golf ball according to the present invention, if the paint film having a storage modulus ($E'_{150}$) at 150° C. of $1.00 \times 10^7$ Pa or more obtained by measuring the dynamic viscoelasticity of the paint film is used, the launch angle can be lowered and the spin rate can be increased on approach shots of less than 40 yards. As a result, the golf ball according to the present invention has enhanced controllability on approach shots of less than 40 yards. In light of this, the storage modulus ($E'_{150}$) at 150° C. is preferably $1.20 \times 10^7$ Pa or more, more preferably $1.50 \times 10^7$ Pa or more. In addition, the storage modulus ($E'_{150}$) at 150° C. is preferably $1.00 \times 10^8$ Pa or less, more preferably $9.00 \times 10^7$ Pa or less, and even more preferably $8.00 \times 10^7$ Pa or less.

In the golf ball according to the present invention, a flat region in which the storage modulus (E') obtained by measuring the dynamic viscoelasticity of the paint film almost keeps constant preferably exists in the region of 120° C. to 150° C. In light of this, the storage modulus ($E'_{120}$) at 120° C. measured with a dynamic viscoelasticity measuring apparatus is preferably $1.00 \times 10^7$ Pa or more, more preferably $1.20 \times 10^7$ Pa or more, and even more preferably $1.50 \times 10^7$ Pa or more. In addition, the storage modulus ($E'_{120}$) at 120° C. is preferably $9.00 \times 10^7$ Pa or less, more preferably $8.00 \times 10^7$ Pa or less.

In the golf ball according to the present invention, the peak temperature of the loss tangent tan δ of the paint film obtained by measuring the dynamic viscoelasticity of the paint film is preferably 60° C. or less, more preferably 58° C. or less, and even more preferably 56° C. or less, and is preferably −40° C. or more, more preferably 0° C. or more, even more preferably 40° C. or more, and most preferably 44° C. or more. If the peak temperature of the loss tangent (tan δ) falls within the above range, viscosity becomes predominant on approach shots, and thus the shot feeling is good.

In the golf ball according to the present invention, the peak height of the loss tangent tan δ of the paint film obtained by measuring the dynamic viscoelasticity of the paint film is less than 0.8, preferably 0.70 or less, more preferably less than 0.60, and even more preferably 0.55 or less. If the peak height of the loss tangent (tan δ) is less than 0.8, the shear force becomes higher and the spin performance becomes better since efficiency of energy transfer becomes better. The peak height of the loss tangent tan δ is preferably 0.3 or more, more preferably 0.31 or more, and even more preferably 0.32 or more. If the peak height of the loss tangent (tan δ) of the paint film is 0.3 or more, the launch angle can be lowered and the spin rate can be increased on approach shots of less than 40 yards.

The 10% elastic modulus of the paint film covering the golf ball body of the present invention is preferably 75 kgf/cm$^2$ or less, more preferably 60 kgf/cm$^2$ or less, and even more preferably 30 kgf/cm$^2$ or less. If the 10% elastic modulus of the paint film is 75 kgf/cm$^2$ or less, the paint film is soft, and the spin rate on approach shots is high. The lower limit of the 10% elastic modulus of the paint film is not particularly limited, but it is preferably 2 kgf/cm$^2$, more preferably 8 kgf/cm$^2$, even more preferably 10 kgf/cm$^2$, and most preferably 12 kgf/cm$^2$. If the 10% elastic modulus is excessively low, the paint film becomes so soft that a tacky feel is remained, and the feeling becomes bad.

The dynamic viscoelasticity and the 10% elastic modulus of the paint film are obtained by preparing a measuring film from the paint composition for forming the paint film under the predetermined conditions, and measuring the dynamic viscoelasticity and the 10% elastic modulus of the measuring film. The preparation method and measuring method of the measuring film will be described later.

The golf ball according to the present invention comprises a golf ball body and a paint film formed on a surface of the golf ball body, wherein an indentation depth of the paint film measured with a nanoindenter in a state that the paint film is formed on the surface of the golf ball body is preferably 1250 nm or more, more preferably 1800 nm or more, and even more preferably 2000 nm or more. The upper limit of the indentation depth of the paint film measured with the nanoindenter is not particularly limited, but the upper limit is preferably 4000 nm or less, more preferably 3000 nm or less, and even more preferably 2800 nm or less. The indentation depth of the paint film measured with the nanoindenter is an index directly showing the physical property of the paint film formed on the golf ball body. If the indentation depth of the paint film measured with the nanoindenter is 1250 nm or more, the spin rate on approach shots under a wet condition and on approach shots from the rough is increased, and the shot feeling on approach shots becomes better as well. In addition, if the indentation depth of the paint film measured with the nanoindenter exceeds 4000 nm, the deformation is so large that tackiness is excessively remained.

The resin component of the paint film of the golf ball according to the present invention preferably contains a polyurethane, wherein the polyurethane comprises, as a constituent component, (A) a polyisocyanate component, and (B) a polyol component containing a polyrotaxane. In addition, the resin component of the paint film of the golf ball according to the present invention more preferably contains a polyurethane obtained by a reaction between (A) the polyisocyanate component, and (B) the polyol component containing the polyrotaxane.

Examples of (A) the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), diisocyanate (TODI), xylene diisocyanate (XDI), tetramethylxylylene diisocyanate (TMXDI), and para-phenylene diisocyanate (PPDI); an alicyclic polyisocyanate or aliphatic polyisocyanate such as 4,4'-dicyclohexylmethane diisocyanate (H$_{12}$MDI), hydrogenated xylylenediisocyanate (H$_6$XDI), hexamethylene diisocyanate (HDI), isophorone diisocyanate (IPDI), and norbornene diisocyanate (NBDI); and derivates of these polyisocyanates. In the present invention, as the polyisocyanate, two or more of the polyisocyanates may be used.

Examples of the derivative of the polyisocyanate include an isocyanurate of diisocyanate; an adduct obtained through a reaction between a diisocyanate and a low molecular weight triol such as trimethylolpropane or glycerin; an allophanate-modified product; and a biuret-modified product. It is preferable that a free diisocyanate is removed from the derivative of the polyisocyanate. The allophanate-modified product is, for example, a trifunctional polyisocyanate obtained by further reacting a diisocyanate with a urethane bond formed through a reaction between a diisocyanate and a low molecular weight diol. The biuret-modified products is, for example, a trifunctional polyisocyanate having a biuret bond and represented by the following formula (1). The isocyanurate of diisocyanate is, for example, a trifunctional polyisocyanate represented by the following formula (2).

It is noted that in the formulae (1) and (2), R represents a residue where the isocyanate group is removed from the diisocyanate.

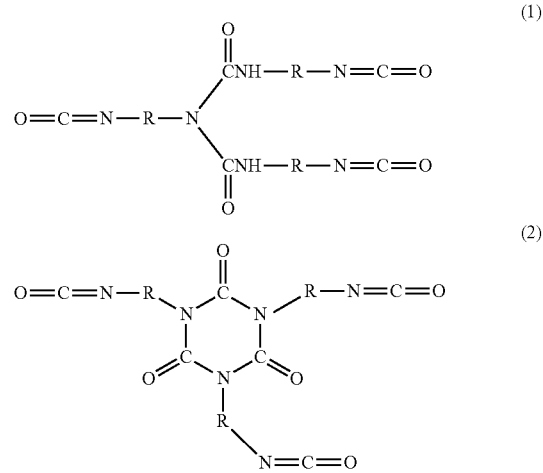

In the present invention, as the polyisocyanate, a derivative of hexamethylene diisocyanate and a derivative of isophorone diisocyanate are preferably used. As the derivate of hexamethylene diisocyanate, an isocyanurate of hexamethylene diisocyanate is preferably used. As the derivate of isophorone diisocyanate, an isocyanurate of isophorone diisocyanate is preferably used.

The mixing ratio (derivate of HDI/derivate of IPDI) of the derivate of hexamethylene diisocyanate to the derivate of isophorone diisocyanate is preferably 90/10 or less, more preferably 80/20 or less, and even more preferably 75/25 or less, and is preferably 10/90 or more, more preferably 30/70 or more, and even more preferably 45/55 or more in a mass ratio.

The content (NCO %) of the isocyanate group in (A) the polyisocyanate is preferably 0.5 mass % or more, more preferably 1 mass % or more, and even more preferably 2 mass % or more, and is preferably 45 mass % or less, more preferably 40 mass % or less, and even more preferably 35 mass % or less. It is noted that the content (NCO %) of the isocyanate group in the polyisocyanate can be represented by 100×[mole number of isocyanate group in polyisocyanate×42 (molecular weight of NCO)]/[total mass (g) of polyisocyanate].

Specific examples of the polyisocyanate include Burnock D-800, Burnock DN-950, and Burnock DN-955 available from DIC corporation; Desmodur N75MPA/X, Desmodur N3300, Desmodur L75 (C), and Sumidur E21-1 available from Sumika Bayer Urethane Co., Ltd; Coronate HX, and Coronate HK available from by Nippon Polyurethane Industry Co., Ltd; Duranate 24A-100, Duranate 21S-75E, Duranate TPA-100, and Duranate TKA-100 available from Asahi Kasei Chemicals Corporation; and VESTANAT T1890 available from Degussa Co., Ltd.

Next, (B) the polyol component containing the polyrotaxane will be explained. The polyrotaxane comprises a cyclodextrin, a linear molecule piercing through the cyclic structure of the cyclodextrin, and blocking groups located at both terminals of the linear molecule to prevent disassociation of the cyclic molecule. The polyrotaxane is viscoelastic, since the cyclodextrin molecule is movable along the linear molecule that penetrates the cyclodextrin in a skewering manner (pulley effect). Even if a tension is applied to the polyrotaxane, the tension can be uniformly dispersed due to the pulley effect. It is noted that in the present invention, the polyol component is not particularly limited as long as it has multiple hydroxyl groups, and the polyrotaxane is the polyol component since multiple hydroxyl groups reactive with the isocyanate group exist on the cyclic structure of the cyclodextrin.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and α-cyclodextrin is preferable. As the cyclodextrin, one type may be used solely, and two or more types may be used in combination.

The linear molecule is preferably a linear molecule capable of piercing through the cyclic structure of the cyclodextrin so that the cyclic structure of the cyclodextrin is rotatable around the linear molecule. Examples of the linear molecule include polyalkylene, polyester, polyether, and polyacrylic acid. Among them, polyether is preferable, and polyethylene glycol is particularly preferable. Polyethylene glycol has less steric hindrance, and thus can easily penetrate the cyclic structure of the cyclodextrin in a manner of piercing through the cyclic structure of the cyclodextrin.

The weight average molecular weight of the linear molecule is preferably 5,000 or more, more preferably 6,000 or more, and is preferably 100,000 or less, more preferably 80,000 or less.

The linear molecule preferably has a functional group at both terminals thereof. If the linear molecule has the functional group, the linear molecule can easily react with the blocking group. Examples of the functional group include a hydroxyl group, carboxyl group, amino group, and thiol group.

The blocking group is not particularly limited, as long as it is located at both terminals of the linear molecule to prevent the cyclodextrin from disassociating from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cyclodextrins penetrated by the linear molecule preferably ranges from 0.06 to 0.61, more preferably ranges from 0.11 to 0.48, and even more preferably ranges from 0.24 to 0.41, when the maximum number thereof is deemed as 1. If the number of the cyclodextrins is less than 0.06, the pulley effect may not be exerted, and if the number of the cyclodextrins exceeds 0.61, the cyclodextrins are very densely located, so that the movability of the cyclodextrin may decrease.

The polyrotaxane used in the present invention is preferably a polyrotaxane having at least a part of hydroxyl groups of the cyclodextrin being modified with a caprolactone chain. If the modification with the caprolactone is performed, the compatibility with the polyurethane is enhanced. Further, if the modification with the caprolactone is performed, the polyrotaxane has enhanced flexibility, and thus the spin performance on approach shots is enhanced.

As the above modification, for example, the hydroxyl groups of the cyclodextrin are treated with propylene oxide to hydroxylalkylate the cyclodextrin, and then ε-caprolactone is added to perform ring-opening polymerization. As a result of this modification, the caprolactone chain —(CO(CH$_2$)$_5$O)$_n$H (n is a natural number of 1 to 100) is linked to the exterior side of the cyclic structure of the cyclodextrin via a —O—C$_3$H$_6$—O— group. "n" represents the degree of polymerization, and is preferably a natural number of 1 to 100, more preferably a natural number of 2 to 70, and even more preferably a natural number of 3 to 40. At the other terminal of the caprolactone chain, a hydroxyl group is formed through the ring-opening polymerization.

The ratio of the hydroxyl groups modified with the caprolactone chain to all the hydroxyl groups (100 mole %) included in the cyclodextrin before the modification is preferably 2 mole % or more, more preferably 5 mole % or more, and even more preferably 10 mole % or more. If the ratio of the hydroxyl groups modified with the caprolactone chain falls within the above range, the polyrotaxane has enhanced flexibility, and thus the spin performance under a wet condition is further enhanced.

FIG. 1 is an explanatory drawing illustrating a molecular structure of one example of the polyrotaxane used in the present invention. The polyrotaxane 200 comprises a cyclodextrin 212, a linear molecule 214 piercing through the cyclic structure of the cyclodextrin 212, and blocking groups 216 located at both terminals of the linear molecule 214 to prevent disassociation of the cyclic molecule, and a caprolactone chain 218 is linked to the exterior side of the cyclic structure of the cyclodextrin via a —O—C$_3$H$_6$—O— group (not shown).

The hydroxyl value of the polyrotaxane is preferably 10 mg KOH/g or more, more preferably 15 mg KOH/g or more, and even more preferably 20 mg KOH/g or more, and is preferably 400 mg KOH/g or less, more preferably 300 mg KOH/g or less, even more preferably 220 mg KOH/g or less, and most preferably 180 mg KOH/g or less. If the hydroxyl value of the polyrotaxane falls within the above range, the reactivity with the polyisocyanate increases, and thus the durability of the paint film becomes more favorable. The hydroxyl value can be measured according to JIS K 1557-1, for example, by an acetylation method.

The total molecular weight of the polyrotaxane is preferably 30,000 or more, more preferably 40,000 or more, and even more preferably 50,000 or more, and is preferably 3,000,000 or less, more preferably 2,500,000 or less, and even more preferably 2,000,000 or less, in a weight average molecular weight. If the weight average molecular weight is 30,000 or more, the paint film has sufficient strength, and if the weight average molecular weight is 3,000,000 or less, the paint film has sufficient flexibility and thus the approach performance of the golf ball is enhanced. It is noted that the weight average molecular weight can be measured, for example, by gel permeation chromatography (GPC) using polystyrene as a standard substance, tetrahydrofuran as an eluant, and an organic solvent GPC column (e.g., "Shodex (registered trademark) KF series" available from Showa Denko K. K.) as a column.

Specific examples of the polyrotaxane modified with the polycaprolactone include SeRM (registered trademark) super polymer SH3400P, SH2400P, and SH1310P available from Advanced Softmaterials Inc.

(B) The polyol component may further contain other polyol components. The other polyol components are not particularly limited as long as the other polyol components have multiple hydroxyl groups, and examples thereof include a low molecular weight polyol and a high molecular weight polyol.

Examples of the low molecular weight polyol include a diol such as ethylene glycol, diethylene glycol, triethylene glycol, propane diol (e.g. 1,2-propane diol, 1,3-propane diol, 2-methyl-1,3-propane diol), dipropylene glycol, butane diol (e.g. 1,2-butane diol, 1,3-butane diol, 1,4-butane diol, 2,3-butane diol, 2,3-dimethyl-2,3-butane diol), neopentyl glycol, pentane diol, hexane diol, heptane diol, octane diol, 1,4-cyclohexane dimethylol, aniline type diol, and bisphenol A type diol; a triol such as glycerin, trimethylol propane, and hexane triol; and a tetraol or hexaol such as pentaerythritol and sorbitol.

Examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol.

The number average molecular weight of the high molecular weight polyol is not particularly limited, but it is, for example, preferably 400 or more, more preferably 1,000 or more. The upper limit of the number average molecular weight of the high molecular weight polyol is not particularly limited, but it is preferably 10,000, more preferably 8,000. If the number average molecular weight of the high molecular weight polyol falls within the above range, the obtained paint film has enhanced adhesion to the golf ball body. It is noted that the number average molecular weight can be measured by gel permeation chromatography (GPO) using polystyrene as a standard substance, tetrahydrofuran as an eluant, and two columns of TSK-GEL SUPERH2500 (available from Tosoh Corporation) as a column.

In a preferable embodiment of the present invention, (B) the polyol component contains at least one member selected from the group consisting of a polyether polyol, a polyester polyol, a polycaprolactone polyol, a polycarbonate polyol, and an acrylic polyol, in addition to the polyrotaxane.

In a more preferable embodiment of the present invention, (B) the polyol component contains a polycaprolactone polyol (poly-ε-caprolactone (PCL)), in addition to the polyrotaxane. Specific examples of the polycaprolactone polyol include Placcel 308 and Placcel 312 available from Daicel Chemical Industries, Ltd., and Capa 4101 and Capa 4801 available from Perstorp Co., Ltd.

Examples of the embodiment of (B) the polyol component include an embodiment where (B) the polyol component consists of the polyrotaxane; an embodiment where (B) the polyol component contains the polyrotaxane and the high molecular weight polyol; an embodiment where (B) the polyol component contains the polyrotaxane and the low molecular weight polyol; and an embodiment where (B) the polyol component contains the polyrotaxane, the low molecular weight polyol and the high molecular weight polyol. In addition, two or more of the low molecular weight polyol or the high molecular weight polyol may be used in combination.

In the case that (B) the polyol component contains the polyrotaxane and another polyol, the amount of the polyrotaxane in (B) the polyol component is preferably 10 mass % or more, more preferably 15 mass % or more, even more preferably 20 mass % or more, and most preferably 50 mass % or more. In addition, the amount of the polyrotaxane in (B) the polyol component is preferably 100 mass % or less, more preferably 90 mass % or less, and even more preferably 80 mass % or less. If the amount of the polyrotaxane falls within the above range, the flexibility which is the property of the polyrotaxane is sufficiently exerted.

The polyurethane used in the present invention may comprise a polyamine as a constituent component, in addition to (A) the polyisocyanate component and (B) the polyol component. The polyamine is not particularly limited as long as it has at least two amino groups. Examples of the polyamine include an aliphatic polyamine, an alicyclic polyamine, and an aromatic polyamine. Examples of the aliphatic polyamine include ethylene diamine, propylene diamine, butylene diamine, and hexamethylene diamine. Examples of the alicyclic polyamine include isophorone diamine and piperazine.

The aromatic polyamine is not particularly limited, as long as it has at least two amino groups directly or indirectly bonded to an aromatic ring. Here, "indirectly bonded to an aromatic ring" means the amino groups are bonded to the aromatic ring via, for example, a lower alkylene group. The aromatic polyamine may be, for example, a monocyclic aromatic polyamine having two or more amino groups bonded to one aromatic ring, or a polycyclic aromatic polyamine having two or more aminophenyl groups each having at least one amino group bonded to one aromatic ring.

Examples of the monocyclic aromatic polyamine include a type having the amino groups directly bonded to the aromatic ring, such as phenylene diamine, toluene diamine, diethyltoluene diamine, and dimethylthiotoluene diamine; and a type having the amino groups such as xylylene diamine bonded to the aromatic ring via a lower alkylene group. In addition, the polycyclic aromatic polyamine may be a poly(aminobezene) having at least two aminophenyl groups directly bonded to each other, or an aromatic polyamine having at least two aminophenyl groups bonded to each other via a lower alkylene group or alkylene oxide group. Among them, diaminodiphenyl alkane having two aminophenyl groups bonded to each other via a lower alkylene group is preferred, 4,4'-diaminodiphenyl methane and a derivate thereof is particularly preferred.

The constitutional embodiment of the polyurethane used in the present invention is not particularly limited, and examples thereof include an embodiment composed of the polyisocyanate component and the polyrotaxane; an embodiment composed of the polyisocyanate component, the polyrotaxane and the high molecular weight polyol component; and an embodiment composed of the polyisocyanate component, the polyrotaxane, the high molecular weight polyol component and the low molecular weight polyol component.

The amount of the polyurethane in the resin component of the paint film is preferably 40 mass % or more, more preferably 50 mass % or more, and even more preferably 55 mass % or more, and is preferably 100 mass % or less, more preferably 95 mass % or less, and even more preferably 90 mass % or less.

The resin component of the paint film according to the present invention may further contain a fluorine resin, an acrylic resin or a vinyl chloride-vinyl acetate copolymer and/or a modified product thereof. Among them, the resin component of the paint film according to the present invention preferably contains the vinyl chloride-vinyl acetate copolymer and/or the modified product thereof. If the vinyl chloride-vinyl acetate copolymer and/or the modified product thereof is contained, the tackiness can be adjusted while maintaining abrasion resistance, and moderate tacky feeling is obtained. Examples of the modification method include a method of copolymerizing a monomer (e.g., vinyl alcohol, hydroxyalkyl acrylate) copolymerizable with vinyl chloride and vinyl acetate; and a method of partially or completely saponifying a vinyl chloride-vinyl acetate copolymer to introduce hydroxyl groups therein.

The amount of the vinyl chloride component in the vinyl chloride-vinyl acetate copolymer and/or the modified product thereof is preferably 1 mass % or more, more preferably 20 mass % or more, and is preferably 99 mass % or less, more preferably 95 mass % or less. In the present invention, as the vinyl chloride-vinyl acetate copolymer and/or the modified product thereof, a hydroxyl group-modified vinyl chloride-vinyl acetate copolymer is preferably used. Specific examples of the vinyl chloride-vinyl acetate copolymer and/or the modified product thereof include Solbin (registered trademark) A, Solbin AL, Solbin TA2, and Solbin TA3 available from Nissin Chemical Industry Co., Ltd.

Further, the amount of the vinyl chloride-vinyl acetate copolymer and/or the modified product thereof in the resin component constituting the paint film is preferably 4 mass % or more, more preferably 8 mass % or more, and is preferably 50 mass % or less, and more preferably 45 mass % or less.

[Paint Composition]

The paint film of the golf ball according to the present invention is preferably formed from a curing type paint composition including a base material consisting of a polyol composition containing (B) the polyrotaxane, and a curing agent consisting of a polyisocyanate composition containing (A) the polyisocyanate component. In the present invention, in order to distinguish the polyol composition containing the polyrotaxane and the polyisocyanate composition containing the polyisocyanate component, as a matter of convenience, the polyol composition containing the polyrotaxane is referred to as the base material, and the polyisocyanate composition containing the polyisocyanate component is referred to as the curing agent. In addition, the base material may also be referred to as the A agent, and the curing agent may also be referred to as the B agent. Furthermore, the polyol composition containing (B) the polyrotaxane may also be referred to as the curing agent, and the polyisocyanate composition containing (A) the polyisocyanate component may also be referred to as the base material.

In the curing type paint composition used in the present invention, the base material preferably contains a compound having reactivity with the isocyanate group included in the curing agent. Specifically, the base material preferably contains (B) the polyol component containing the polyrotaxane. Further, the base material of the curing type paint composition preferably contains the vinyl chloride-vinyl acetate copolymer and/or the modified product thereof.

In the curing reaction of the curing type paint composition, the molar ratio (NCO group/OH group) of the isocyanate group (NCO group) of (A) the polyisocyanate component to the hydroxyl group (OH group) included in (B) the polyol component containing the polyrotaxane is preferably 0.95 or more, more preferably 1.05 or more, and even more preferably 1.10 or more. If the molar ratio (NCO group/OH group) is less than 0.95, the curing reaction may become insufficient. Further, if the molar ratio (NCO group/OH group) is too large, the amount of the isocyanate group is excessive, and the obtained paint film may become hard and fragile as well as the appearance of the obtained paint film may deteriorate. Thus, the molar ratio (NCO group/OH group) is preferably 2.0 or less, more preferably 1.8 or less, and even more preferably 1.5 or less. It is noted that the reason why the appearance of the obtained paint film deteriorates if the amount of the isocyanate group in the paint becomes excessive is considered as follows: an excessive amount of the isocyanate group may promote a reaction between the moisture in air and the isocyanate group, thereby generating a lot of carbon dioxide gas. It is noted that, when the NCO/OH molar ratio in the curing reaction is taken into account, the hydroxyl group of the base material includes the hydroxyl groups of the polyrotaxane and the polyol, but excludes the hydroxyl groups of the modified product of the vinyl chloride-vinyl acetate copolymer, the modified silicone which will be described later, and the like.

A conventionally known catalyst can be employed for the curing reaction. Examples of the catalyst include a monoamine such as triethyl amine and N,N-dimethylcyclohexylamine; a polyamine such as N,N,N',N'-tetramethylethylene diamine and N,N,N',N'', N''-pentamethyldiethylene triamine; a cyclic diamine such as 1,8-diazabicyclo[5.4.0]-7-undecene (DBU) and triethylene diamine; a tin catalyst such as dibutyl tin dilaurate and dibutyl tin diacetate. These catalysts may be used solely, or two or more of the catalysts may be used in combination. Among them, the tin catalyst such as dibutyl tin dilaurate and dibutyl tin diacetate is preferred, and in particular, dibutyl tin dilaurate is preferably used.

[Solvent]

The curing type paint composition is preferably a solvent based paint containing an organic solvent as a dispersion medium. The polyrotaxane is insoluble in water, and thus the organic solvent is preferably used. Examples of the preferable solvent include toluene, isopropyl alcohol, xylene, methylethyl ketone, methylisobutyl ketone, ethylene glycol monomethyl ether, ethylbenzene, propylene glycol monomethyl ether, isobutyl alcohol, and ethyl acetate. It is noted that the solvent may be added in either of the base material and the curing agent, and in light of uniformly performing the curing reaction, the solvent is preferably added in the base material and the curing agent, respectively.

The curing type paint composition preferably further contains a modified silicone. If the modified silicone which is used as a leveling agent is contained, unevenness of the coated surface can be reduced, and thus a smooth coated surface can be formed on the surface of the golf ball. Examples of the modified silicone include a modified silicone having an organic group being introduced to a side chain or an end of a polysiloxane skeleton, a polysiloxane block copolymer obtained by copolymerizing a polyether block and/or a polycaprolactone block, etc. with a polysiloxane block, and a modified silicone having an organic group being introduced to a side chain or an end of the polysiloxane block copolymer. The polysiloxane skeleton or the polysiloxane block is preferably linear, and examples thereof include dimethyl polysiloxane, methylphenyl polysiloxane, and methyl hydrogen polysiloxane. Examples of the organic group include an amino group, epoxy group, mercapto group, and carbinol group. In the present invention, as the modified silicone oil, a polydimethylsiloxane-polycaprolactone block copolymer is preferably used, and a terminal carbinol-modified polydimethylsiloxane-polycaprolactone block copolymer is more preferably used. This is because these block copolymers have excellent compatibility with the caprolactone-modified polyrotaxane and the polycaprolactone polyol. Specific examples of the modified silicone used in the present invention include DBL-C31, DBE-224, and DCE-7521 available from Gelest, Inc.

The modified silicone is remained in the paint film formed from the paint composition. The amount of the modified silicone in the paint film and the curing type paint composition is preferably 0.01 part by mass or more, more preferably 0.05 part by mass or more, and is preferably 10 parts by mass or less, more preferably 5 parts by mass or less, with respect to 100 parts by mass of the resin component constituting the paint film.

The curing type paint composition may further include additives generally included in the paint for a golf ball, such as a filler, ultraviolet absorber, antioxidant, light stabilizer, fluorescent brightener, anti-blocking agent, leveling agent, slip agent, and viscosity modifier, where necessary.

Next, the method of applying the curing type paint composition of the present invention will be described. The method of applying the curing type paint composition is not limited, a conventionally known method can be adopted, and examples thereof include a spray coating and electrostatic coating.

In the case of performing the spray coating with an air gun, the base material and the curing agent are fed with respective pumps and continuously mixed with a line mixer located in the stream line just before the air gun, and the obtained mixture is air-sprayed. Alternatively, the base material and the curing agent are air-sprayed respectively with an air spray system provided with a device for controlling the mixing ratio thereof. The paint application may be conducted by spraying the paint one time or overspraying the paint multiple times.

The curing type paint applied to the golf ball body can be dried, for example, at a temperature ranging from 30° C. to 70° C. for 1 hour to 24 hours to form the paint film.

The thickness of the paint film after drying is preferably, without limitation, 5 μm or more, more preferably 6 μm or more, even more preferably 10 μm or more, and most preferably 15 μm or more. If the thickness is less than 5 μm, the paint film is likely to wear off due to the continued use, and thickening the paint film increases the spin rate on approach shots. The thickness of the paint film is preferably 50 μm or less, more preferably 45 μm or less, and even more preferably 40 μm or less. If the thickness of the paint film is thicker than 50 μm, the dimple effect is lowered, and thus the flying performance of the golf ball tends to be lowered.

The thickness of the paint film can be measured, for example, by observing a cross section of the golf ball using a microscope (VHX-1000 available from Keyence Corporation). In the case of overpainting the paint, a total thickness of the formed paint film preferably falls within the above range.

The paint film of the golf ball according to the present invention may have a single-layered construction or a multiple-layered construction, and preferably has the single-layered construction.

[Golf Ball Body]

The golf ball according to the present invention is not particularly limited, as long as it is a golf ball comprising a golf ball body and a paint film covering the golf ball body. The golf ball body preferably comprises a cover. The construction of the golf ball body is not particularly limited, and the golf ball body may be a two-piece golf ball, a three-piece golf ball, a multi-piece golf ball such as a four-piece golf ball and a golf ball comprising more than four pieces, or a wound golf ball. The present invention can be applied suitably to any one of the above golf balls.

The golf ball body according to the present invention preferably comprises a core and a cover covering the core. An intermediate layer may be further comprised between the core and the cover.

Figure 2:
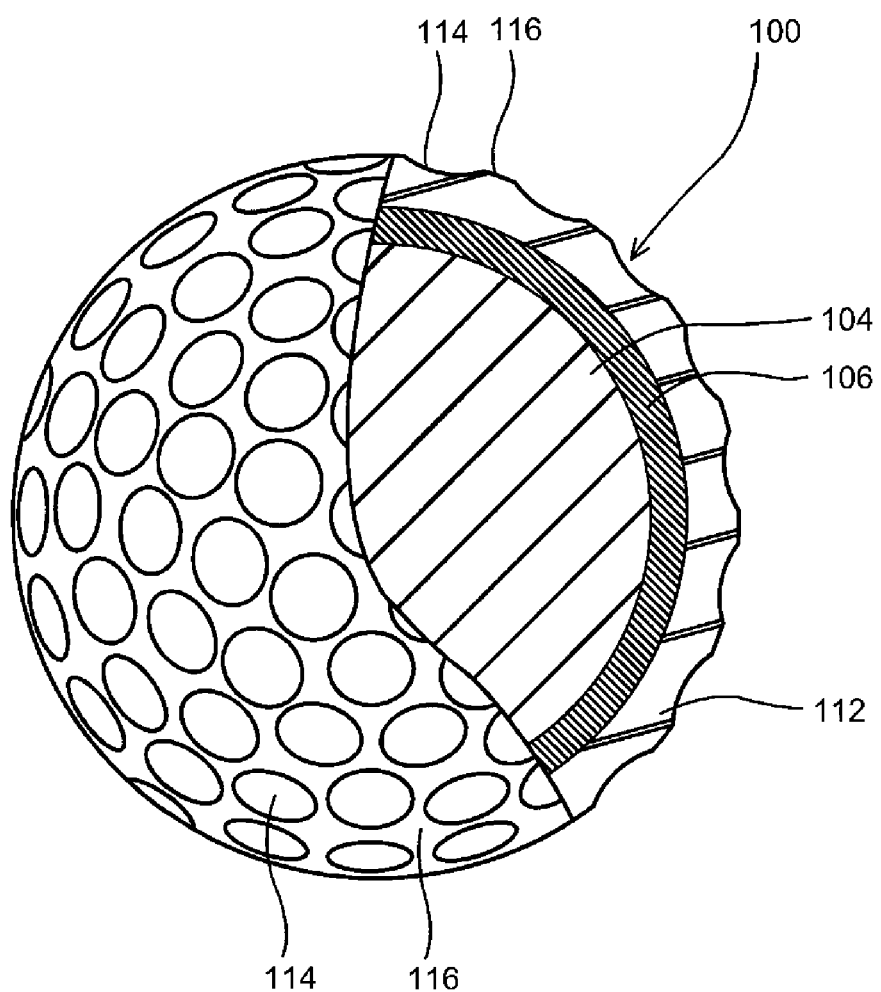
FIG. 2 is a partially cutaway cross-sectional view of a golf ball according to one embodiment of the present invention.

FIG. 2 is a partially cutaway cross-sectional view showing a golf ball 100 according to one embodiment of the present invention. The golf ball 100 comprises a spherical core 104, an intermediate layer 106 covering the spherical core 104, a cover 112 covering the intermediate layer 106. On the surface of the cover 112, a plurality of dimples 114 are formed. On the surface of the golf ball, a part other than the dimples 114 is a land 116. The golf ball further comprises a paint layer and a mark layer on the outer side of the cover, but these layers are not depicted.

In the preferable embodiment of the present invention, the material hardness of the cover of the golf ball body is preferably 50 or more, more preferably 55 or more, and even more preferably 58 or more in Shore D hardness. If the material hardness of the cover is 50 or more in Shore D hardness, the flight distance on driver shots is greater. The upper limit of the hardness of the cover is not particularly limited, but it is preferably 90, more preferably 80, and even more preferably 70 in Shore D hardness. If the hardness of the cover is excessively high, the golf ball has lowered durability. The material hardness of the cover is a slab hardness obtained by measuring a cover composition molded into a sheet form. It is noted that the material hardness of the cover is the material hardness of the outermost cover of the golf ball body.

In another preferable embodiment of the present invention, the material hardness of the cover of the golf ball body is preferably 30 or more, more preferably 40 or more, even more preferably 50 or more, and most preferably 55 or more in Shore D hardness. In addition, the material hardness of the cover is preferably 90 or less, more preferably 80 or less, and even more preferably 70 or less in Shore D hardness. The obtained golf ball has better shot feeling and durability by suitably adjusting the cover hardness. The material hardness of the cover is a slab hardness obtained by measuring a cover composition molded into a sheet form.

In the present invention, the thickness of the cover of the golf ball is not particularly limited, but it is preferably 4 mm or less, more preferably 2 mm or less, and even more preferably 1 mm or less. If the thickness of the cover 4 mm or less, the outer diameter of the core can be increased, and thus the resilience performance can be enhanced. The lower limit of the thickness of the cover is not particularly limited, but it is preferably 0.3 mm, more preferably 0.4 mm, and even more preferably 0.5 mm. If the thickness of the cover is less than 0.3 mm, the molding of the cover may become difficult.

The cover material constituting the cover of the golf ball according to the present invention is not particularly limited, and examples thereof include various resins such as an ionomer resin, a polyester resin, a urethane resin like a thermoplastic urethane resin or a two-component curing type urethane resin, and a polyamide resin; and a thermoplastic polyamide elastomer having a trade name of "Pebax (registered trademark) (e.g. "Pebax 2533")" available from Arkema Inc., a thermoplastic polyester elastomer having a trade name of "Hytrel (registered trademark) (e.g. "Hytrel 3548" and "Hytrel 4047")" available from Du Pont-Toray Co., Ltd., a thermoplastic polyurethane elastomer having a trade name of "Elastollan (registered trademark) (e.g. "Elastollan XNY97A")" available from BASF Japan Ltd, and a thermoplastic styrene elastomer having a trade name of "Rabalon (registered trademark)" and a thermoplastic polyester elastomer having a trade name of "Primalloy" available from Mitsubishi Chemical Corporation. In the present invention, as the cover material, the ionomer resin is preferably used. These cover materials may be used solely, or two or more of these cover materials may be used in combination.

The cover may include a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or a fluorescent brightener, or the like, in addition to the above resin component, as long as they do not impair the performance of the cover.

The embodiment for molding the cover from the cover composition is not particularly limited, and examples thereof include an embodiment comprising injection molding the cover composition directly onto the core; and an embodiment comprising molding the cover composition into hollow shells, covering the core with a plurality of the hollow shells and compression molding the core with a plurality of the hollow shells (preferably an embodiment comprising molding the cover composition into half hollow-shells, covering the core with two of the half hollow-shells and compression molding the core with two of the half hollow-shells). After the cover is molded, the obtained golf ball body is ejected from the mold, and as necessary, the golf ball body is preferably subjected to surface treatments such as deburring, cleaning, and sandblast. If desired, a mark may be formed.

The total number of the dimples formed on the cover is preferably 200 or more and 500 or less. If the total number of the dimples is less than 200, the dimple effect is hardly obtained. If the total number exceeds 500, the dimple effect is hardly obtained because the size of the respective dimples is small. The shape (shape in a plan view) of the formed dimple includes, for example, without limitation, a circle; a polygonal shape such as a roughly triangular shape, a roughly quadrangular shape, a roughly pentagonal shape, and a roughly hexagonal shape; and another irregular shape. The shape may be employed solely, or two or more of the shapes may be employed in combination.

The golf ball preferably has a diameter ranging from 40 mm to 45 mm. In light of satisfying a regulation of US Golf Association (USGA), the diameter is preferably 42.67 mm or more. In light of prevention of the air resistance, the diameter is preferably 44 mm or less, more preferably 42.80 mm or less. The golf ball preferably has a mass of 40 g or more and 50 g or less. In light of obtaining greater inertia, the golf ball more preferably has a mass of 44 g or more, even more preferably 45.00 g or more. In light of satisfying a regulation of USGA, the golf ball preferably has a mass of 45.93 g or less.

In one preferable embodiment, when the golf ball according to the present invention has a diameter ranging from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball is not excessively hard, and thus the shot feeling thereof is better. On the other hand, if the compression deformation amount is 4.0 mm or less, the resilience of the golf ball becomes better.

In another preferable embodiment, when the golf ball according to the present invention has a diameter ranging from 40 mm to 45 mm, the compression deformation amount (shrinking amount along the compression direction) of the golf ball when applying a load from 98 N as an initial load to 1275 N as a final load to the golf ball is preferably more than 3.0 mm, more preferably 3.2 mm or more, and even more preferably 3.5 mm or more, and is preferably 5.5 mm or less, more preferably 4.8 mm or less, and even more preferably 4.5 mm or less. If the compression deformation amount is more than 3.0 mm, the golf ball has better shot feeling. On the other hand, if the compression deformation amount is 5.5 mm or less, the golf ball has higher resilience.

Next, the core used for a wound golf ball, two-piece golf ball and multi-piece golf ball, and the one-piece golf ball body will be explained.

The core or the one-piece golf ball body may use a conventionally known rubber composition (hereinafter simply referred to as "core rubber composition" occasionally), and may be formed by heat pressing, for example, a rubber composition containing a base rubber, a co-crosslinking agent and a crosslinking initiator.

As the base rubber, particularly preferred is a high cis-polybutadiene having a cis-bond in a proportion of 40 mass % or more, more preferably 70 mass % or more, and even more preferably 90 mass % or more in view of its advantageous resilience. As the co-crosslinking agent, an $\alpha,\beta$-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent to be used is preferably 20 parts by mass or more and 50 parts by mass or less, with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator to be used is preferably 0.2 part by mass or more, more preferably 0.3 part by mass or more, and is preferably 3 parts by mass or less, more preferably 2 parts by mass or less, with respect to 100 parts by mass of the base rubber. In addition, the core rubber composition may further include an organic sulfur compound. As the organic sulfur compound, diphenyl disulfides, thiophenols or thionaphthols may be preferably used. The amount of the organic sulfur compound to be used is preferably 0.1 part by mass or more, more preferably 0. 3 part by mass or more, and is preferably 5.0 parts by mass or less, more preferably 3.0 parts by mass or less, with respect to 100 parts by mass of the base rubber. The core rubber composition may further include a carboxylic acid and/or a salt thereof. As the carboxylic acid and/or the salt thereof, a carboxylic acid having 1 to 30 carbon atoms and/or a salt thereof is preferred. The amount of the carboxylic acid and/or the salt thereof to be used is preferably 1 part by mass or more and 40 parts by mass or less, with respect to 100 parts by mass of the base rubber.

The core rubber composition may further include a weight adjusting agent such as zinc oxide and barium sulfate, an antioxidant, or a colored powder, in addition to the base rubber, the co-crosslinking agent, the crosslinking initiator, and the organic sulfur compound. The molding conditions for heat pressing the core rubber composition may be determined appropriately depending on the rubber formulation. Generally, the heat pressing is preferably carried out at 130° C. to 200° C. for 10 to 60 minutes, or carried out in a two-step heating of heating at 130° C. to 150° C. for 20 to 40 minutes followed by heating at 160° C. to 180° C. for 5 to 15 minutes.

[Golf Ball]

In the case that the golf ball according to the present invention is a three-piece golf ball, and a multi-piece golf ball such as a four-piece golf ball and a golf ball comprising more than four pieces, examples of the material for an intermediate layer disposed between the core and the outmost cover include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing, with a metal ion, at least a part of carboxyl groups in a copolymer composed of ethylene and an α,β-unsaturated carboxylic acid; and a product obtained by neutralizing, with a metal ion, at least a part of carboxyl groups in a terpolymer composed of ethylene, an α,β-unsaturated carboxylic acid and an α,β-unsaturated carboxylic acid ester. The intermediate layer may further include a weight adjusting agent such as barium sulfate and tungsten, an antioxidant, and a pigment. The intermediate layer may be referred to as an inner cover layer or an outer core depending on the construction of the golf ball.

Examples

Hereinafter, the present invention will be described in detail by way of examples. However, the present invention is not limited to the examples described below, and various changes and modifications without departing from the gist of the present invention are included in the scope of the present invention.

[Evaluation Method]

(1) Material (Slab) Hardness (Shore D Hardness)

Sheets with a thickness of about 2 mm were produced by injection molding the intermediate layer composition or cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D" or "Shore A".

(2) Measurement of Dynamic Viscoelasticity

The storage modulus E' (Pa), loss modulus E" (Pa) and loss tangent (tan δ) of the paint film were measured under the following conditions.

Apparatus: dynamic viscoelasticity measuring apparatus Rheogel-E4000 available from UBM Co. Ltd.

Measuring sample: The base material and the curing agent were blended to prepare a paint, and the paint was dried and cured at 40° C. for 4 hours to prepare a paint film having a thickness ranging from 0.11 mm to 0.14 mm. A test piece having a width of 4 mm and a distance between the clamps of 20 mm was cut from the paint film.

Measuring mode: tensile mode
Measuring temperature: from −100° C. to 150° C.
Temperature rising rate: 4° C./min
Measuring data capturing interval: 4° C.
Oscillation frequency: 10 Hz
Measuring strain: 0.1%

(3) Indentation Depth of Paint Film

In the measurement of the indentation depth, the golf ball was cut to obtain a hemisphere. On the hemisphere, a cross section passing through the central point of the golf ball was exposed. The cross section includes a cross section of the paint film. The cross section of the hemisphere was made horizontal by a cryo-microtome. An indenter of a nanoindenter was brought into contact with the cross section of the paint film and pressed in a direction perpendicular to the cross section. The indenter advanced by the pressing. The load and the advancing distance of the indenter were measured. The measuring conditions were as follows.

Nanoindenter: "ENT-2100" available from ELIONIX Inc.
Temperature: 30° C.
Indenter: Berkovich indenter (65.03° As (h)=26.43 h2)
Number of partitions: 500 steps, Step interval: 20 msec (100 mgf)

The load of the indenter was gradually increased until the load of the indenter reached 50 mgf. The advancing distance (nm) of the indenter was measured as the indentation depth when the load was 30 mgf.

(4) 10% Elastic Modulus of Paint Film ($kgf/cm^2$)

The 10% elastic modulus of the paint film was measured according to JIS K7161 (2014). Specifically, the base material (polyol composition) and the curing agent (polyisocyanate composition) were blended to prepare a paint, and the paint was dried and cured at 40° C. for 4 hours to prepare a paint film (thickness: 0.05 mm). The paint film was punched into the Test Piece Type 2 (width of parallel part: 10 mm, gauge length: 50 mm) prescribed in JIS K7127 (1999) to prepare a test piece. The tensile test of the test piece was conducted using a precision universal tester (Autograph (registered trademark) available from Shimadzu Corporation) under testing conditions of a length between grips: 100 mm, a tensile speed: 50 mm/min and a testing temperature: 23° C.

(5) Thickness of Paint Film (μm)

The golf ball was cut into two hemispheres, and the cross section of the paint film on the hemisphere was observed with a microscope (VHX-1000 available from Keyence Corporation) to obtain the thickness of the paint film.

(6) Spin Rate on Approach Shots Under Wet Condition

A sand wedge (trade name: "CG 15 forged wedge", loft angel: 52°, available from Cleveland Golf) was installed on a swing machine available from Golf Laboratories, Inc. The golf ball was hit at a head speed of 21 m/sec, and the spin rate (rpm) thereof was measured. It is noted that the measurement was conducted under a condition that the club face and the golf ball were wetted with water. A sequence of photographs of the hit golf ball were taken for measuring the spin rate. The measurement was conducted ten times for each golf ball, and the average value thereof was calculated respectively.

(7) Shot Feeling

An actual hitting test was carried out by ten amateur golfers (high skilled persons) using a sand wedge (CG 15 forged wedge (58°) available from Cleveland Golf). In accordance with the number of people who answered the shot feeling was good (feeling like that the golf ball was lifted on the club face, feeling like that the golf ball gripped the club surface, feeling like that the spin was imparted, feeling like that the golf ball was stuck on the club face, etc.), the golf balls were evaluated as follows.

E (Excellent): 8 or more
G (Good): 5 to 7
F (Fair): 3 to 4
P (Poor): 2 or less (8) Stain Resistance The golf ball was immersed for 30 seconds in an aqueous solution of tincture of iodine obtained by diluting a tincture of iodine (an ethanol solution containing 6 mass % of iodine and 4 mass % of potassium iodide) to 40 times, and then taken out. After the extra aqueous solution of tincture of iodine adhered on the surface of the golf ball was wiped off, color tones (L, a, b) of the golf ball before and after the immersion were measured using a color difference meter (CM3500D available from Konica Minolta Inc.), and the color difference ($\Delta E$) was calculated according to the following formula. It is noted that a larger color difference ($\Delta E$) value means a larger color change extent.

$$\Delta E=[(\Delta L)^2+(\Delta a)^2+(\Delta b)^2]^{1/2}$$

Evaluation Standard

E (Excellent): $\Delta E$ is 15 or less
G (Good): $\Delta E$ is more than 15 and 20 or less
P (Poor): $\Delta E$ is more than 20

(9) Spin Rate on Approach Shots From Rough

Figure 3:
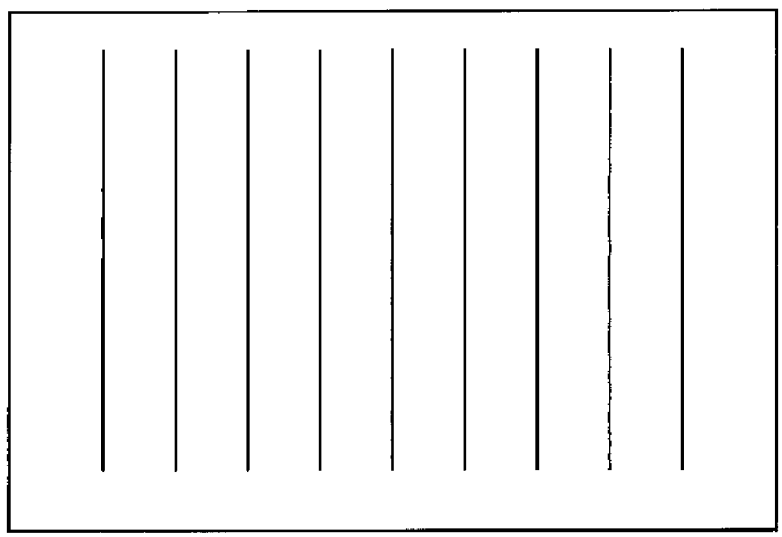
FIG. 3 is an explanatory drawing illustrating an embodiment for forming slits on a wet paper.

A wetted paper provided with slits was attached to the surface of a club face of a sand wedge and the controllability on approach shots from the rough was evaluated. In this test method, the golf ball having a high spin rate is excellent in the controllability on approach shots from the rough. Specifically, a sand wedge (trade name: "CG 15 forged wedge", loft angel: 52°, available from Cleveland Golf) was installed on a swing machine available from Golf Laboratories, Inc. As shown in FIG. 3, slits were formed at an interval of 5 mm on Sontar maintenance cloth thick type (size: 56 mm×56 mm) available from E. I. du Pont de Nemours and Company, the cloth was dipped into water, and the wetted paper was attached to the surface of the club face such that the slits were perpendicular to the grooves of the club face. At this state, the golf ball was hit at a head speed of 16 m/sec, and the spin rate (rpm) thereof was measured. A sequence of photographs of the hit golf ball were taken for measuring the spin rate. The measurement was conducted ten times for each golf ball, and the average value thereof was calculated respectively.

(10) Compression Deformation Amount (mm)

The deformation amount of the core or golf ball along the compression direction (shrinking amount of the core or golf ball along the compression direction), when applying a load from 98 N as an initial load to 1275 N as a final load to the core or golf ball, was measured.

(11) Coefficient of Restitution

A metal cylindrical object with a mass of 198.4 g was allowed to collide with each golf ball at a speed of 40 m/sec,
and the speeds of the cylindrical object and the golf ball before and after the collision were measured. Based on these speeds and the mass of each object, the coefficient of restitution of each golf ball was calculated. The measurement was conducted by using twelve samples for each golf ball, and the average value thereof was adopted as the coefficient of restitution of the golf ball.

(12) Shot Feeling on Driver Shots

An actual hitting test was carried out by ten amateur golfers (high skilled persons) using a driver (SRIXON Z-765 available from Dunlop Sports Co. Limited). In accordance with the number of people who answered the shot feeling was good (feeling like that the golf ball was soft, feeling like that the resilient impact was just right, feeling like that vibration coming into the hand was just right, feeling like that the golfer steadily hit the golf ball without losing to the golf ball, etc.), the golf balls were evaluated as follows.

E (Excellent): 8 or more
G (Good): 5 to 7
F (Fair): 3 to 4
P (Poor): 2 or less

[Production of Two-Piece Golf Ball]

(1) Production of Spherical Core

The core rubber compositions having the formulations shown in Table 1 were kneaded, and heat-pressed in upper and lower molds, each having a hemispherical cavity, at 170° C. for 20 minutes to obtain the spherical core having a diameter 39.7 mm.

TABLE 1

| | Core composition No. | | | | |
|---|---|---|---|---|---|
| | A | B | C | D | E |
| Polybutadiene rubber | 100 | 100 | 100 | 100 | 100 |
| Zinc acrylate | 25.5 | 22.5 | 20.5 | 30.0 | 32.0 |
| Zinc oxide | 5 | 5 | 5 | 5 | 5 |
| Barium sulfate | Appropriate amount* | Appropriate amount* | Appropriate amount* | Appropriate amount* | Appropriate amount* |
| Diphenyl disulfide | 0.5 | 0.5 | 0.5 | 0.5 | 0.5 |
| Dicumyl peroxide | 0.8 | 0.8 | 0.8 | 0.8 | 0.8 |
| Diameter (mm) | 39.7 | 39.7 | 39.7 | 39.7 | 39.7 |
| Surface hardness (Shore D) | 51 | 50 | 49 | 53 | 54 |
| Center hardness (Shore D) | 40 | 40 | 39 | 41 | 41 |
| Compression deformation amount (mm) | 3.95 | 4.25 | 4.45 | 3.45 | 3.15 |

*Adjustment was made such that the golf ball had a mass of 45.3 g.

Polybutadiene rubber: "BR730 (high cis-polybutadiene)" available from JSR Corporation Zinc acrylate: ZN-DA90S (product of 10% zinc stearate coating) available from Nihon Jyoryu Kogyo Co., Ltd.

Zinc oxide: "Ginrei R" available from Toho Zinc Co., Ltd.

Barium sulfate: "Barium Sulfate BD" available from Sakai Chemical Industry Co., Ltd.

Diphenyl disulfide: available from Sumitomo Seika Chemicals Co., Ltd.

Dicumyl peroxide: "Percumyl (register trademark) D" available from NOF Corporation (2) Preparation of Cover Composition According to the formulations shown in Table 2, the materials were mixed with a twin-screw kneading extruder to prepare the cover composition in a pellet form. The extruding conditions were a screw diameter of 45 mm, a screw rotational speed of 200 rpm, and screw L/D=35, and the mixtures were heated to 200° C. to 260° C. at the die position of the extruder.

TABLE 2

| | Cover composition No. | | | | |
|---|---|---|---|---|---|
| | a | b | c | d | e |
| Himilan 1702 | — | 10 | 17.5 | 30 | — |
| Himilan 1605 | 45 | — | 5 | — | — |
| Surlyn 8945 | — | — | — | — | — |
| Himilan AM7329 | 40 | — | 22.5 | — | — |
| Himilan 7337 | — | 40 | — | — | — |
| Himilan AM7327 | 15 | 50 | 55 | 40 | 100 |
| Ultramarine blue | 0.08 | 0.08 | 0.08 | 0.08 | 0.08 |
| Titanium dioxide | 4 | 4 | 4 | 4 | 4 |
| Slab hardness (Shore D) | 60 | 57 | 50 | 44 | 40 |

The materials used in Table 2 are shown as follows.

Himilan 1702: zinc ion neutralized ethylene-methacrylic acid copolymer ionomer resin available from Du Pont-Mitsui Polychemicals Co., Ltd.

Himilan 1605: sodium ion neutralized ethylene-methacrylic acid copolymer ionomer resin available from Du Pont-Mitsui Polychemicals Co., Ltd.

Himilan AM7329: zinc ion neutralized ethylene-methacrylic acid copolymer ionomer resin available from Du Pont-Mitsui Polychemicals Co., Ltd.

Himilan 7337: sodium ion neutralized ethylene-methacrylic acid copolymer ionomer resin available from Du Pont-Mitsui Polychemicals Co., Ltd.

Himilan AM7327: zinc ion neutralized ethylene-methacrylic acid-butyl acrylate copolymer ionomer resin available from Du Pont-Mitsui Polychemicals Co., Ltd.

Surlyn 8945: sodium ion neutralized ethylene-methacrylic acid copolymer ionomer resin available from E. I. du Pont de Nemours and Company (3) Production of Cover The cover composition obtained above was directly injection molded on the spherical core obtained as described above to form the cover. Upper and lower molds for molding have a hemispherical cavity and a retractable hold pin holding the spherical core. When molding the cover, the hold pins were protruded to hold the spherical core after the spherical core was charged, and the cover composition heated to 260° C. was charged for 0.3 second into the mold held under a pressure of 80 tons, and cooled for 30 seconds to mold the cover (thickness: 1.45 mm).

(4) Preparation of Paint

Figure 4:
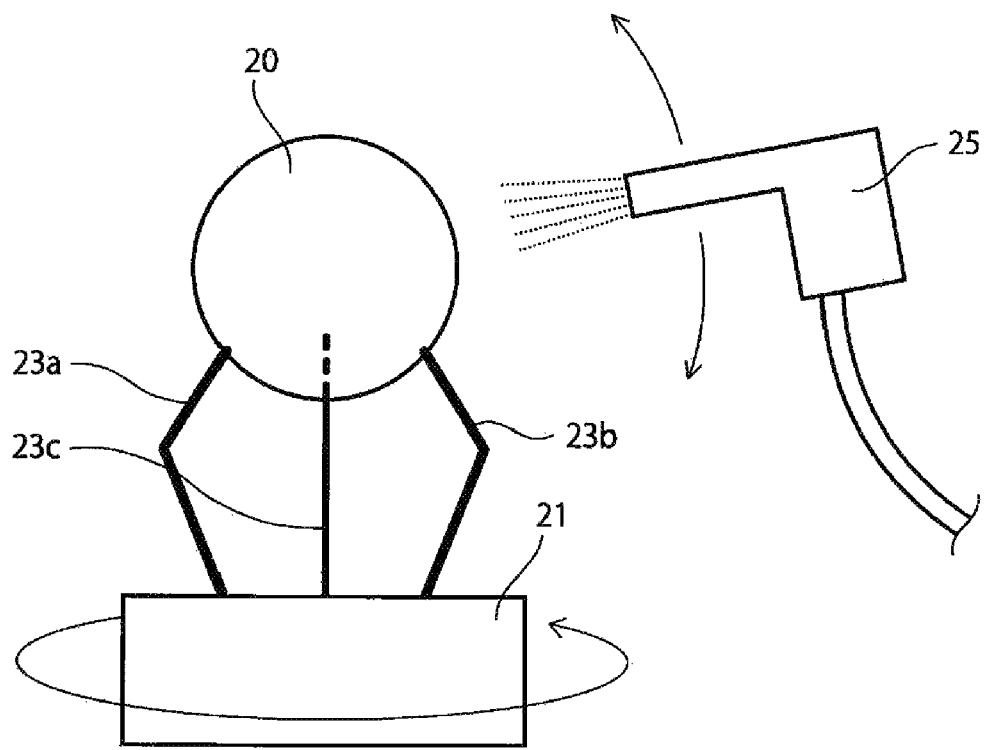
FIG. 4 is a schematic view showing one example of an embodiment for applying a paint with an air gun.
Figure 5:
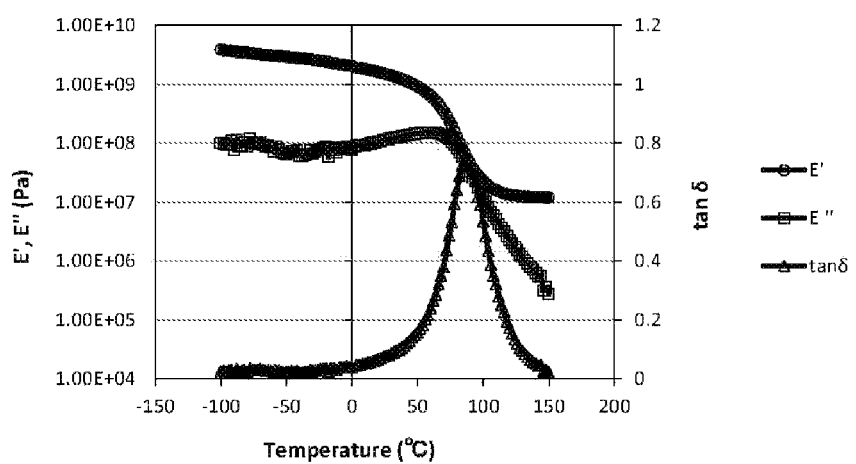
FIG. 5 is a graph showing dynamic viscoelasticity of the paint film No. 1.
Figure 6:
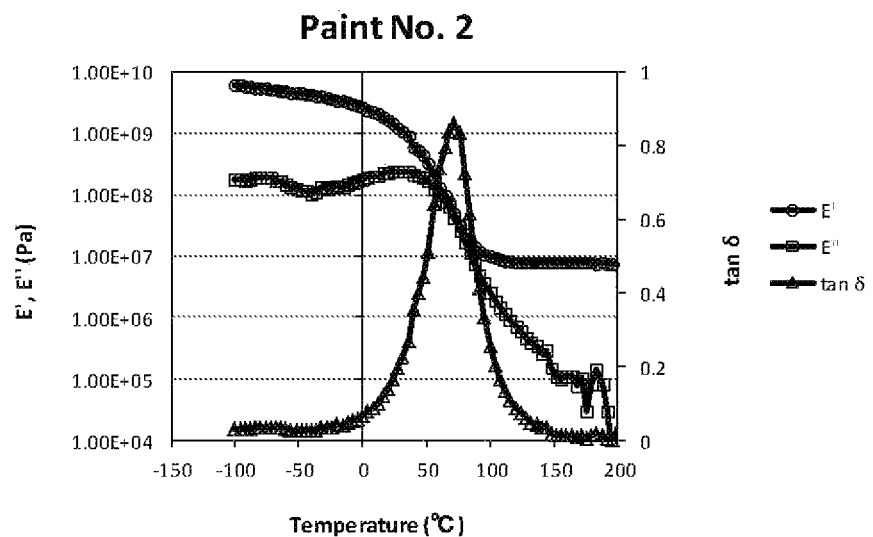
FIG. 6 is a graph showing dynamic viscoelasticity of the paint film No. 2.
Figure 7:
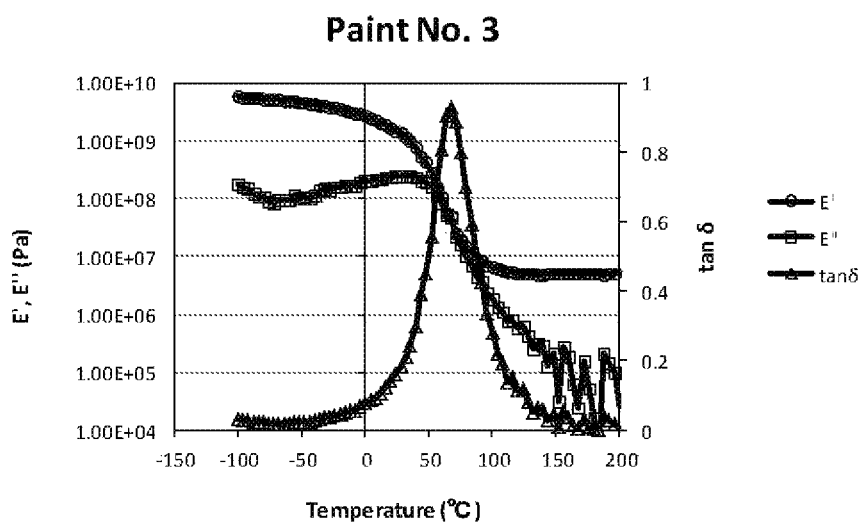
FIG. 7 is a graph showing dynamic viscoelasticity of the paint film No. 3.
Figure 8:
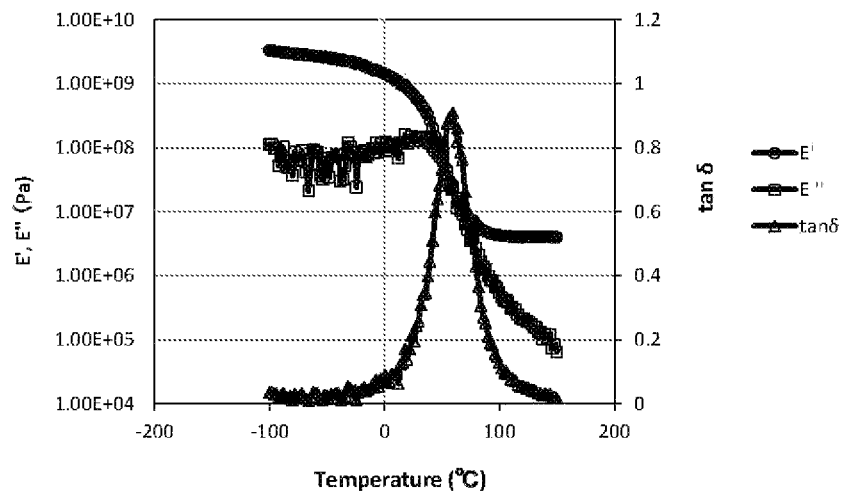
FIG. 8 is a graph showing dynamic viscoelasticity of the paint film No. 4.
Figure 9:
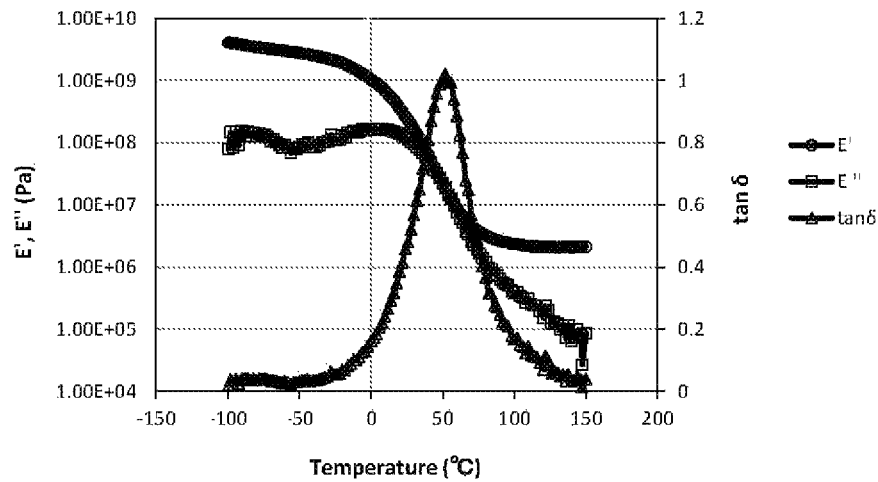
FIG. 9 is a graph showing dynamic viscoelasticity of the paint film No. 5.
Figure 10:
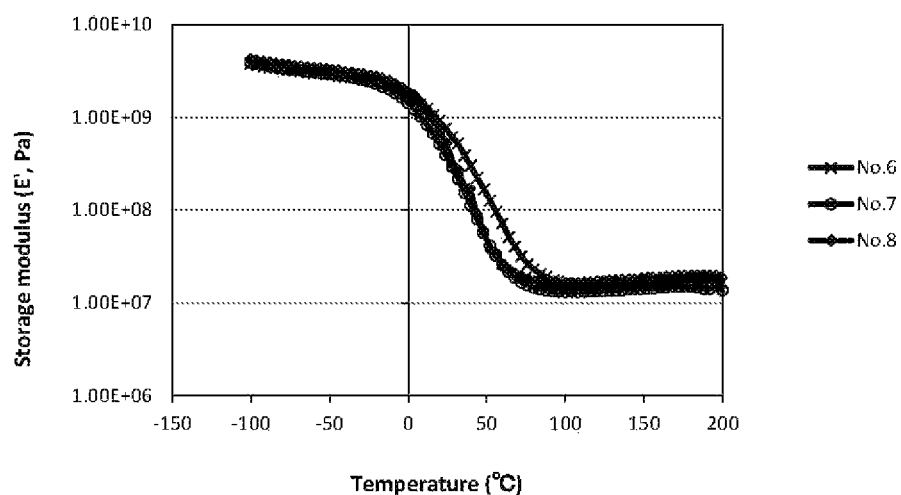
FIG. 10 is a graph showing a relationship between a storage modulus (E') of the paint films No. 6 to No. 8 and a temperature.
Figure 11:
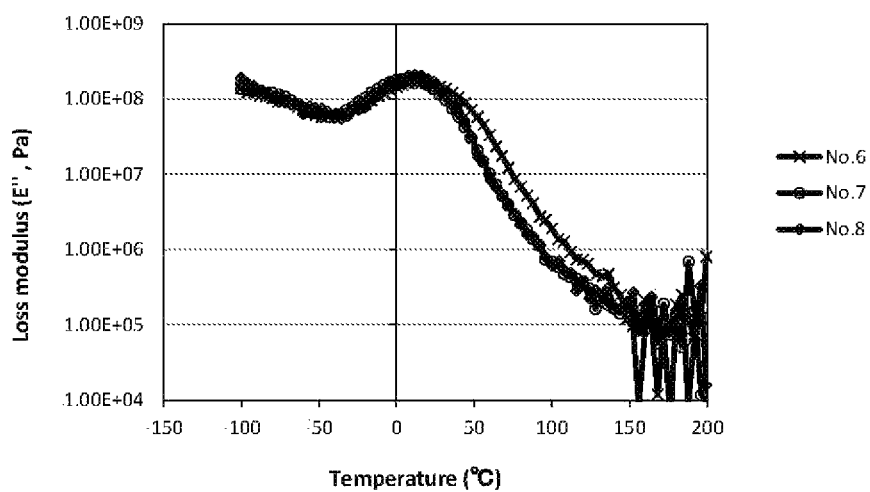
FIG. 11 is a graph showing a relationship between a loss modulus (E") of the paint films No. 6 to No. 8 and a temperature.
Figure 12:
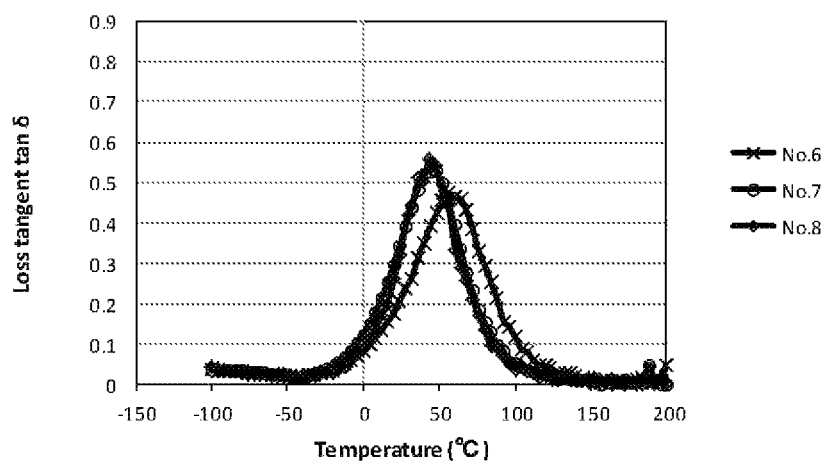
FIG. 12 is a graph showing a relationship between a loss tangent (tan δ) of the paint films No. 6 to No. 8 and a temperature.

According to the formulations shown in Tables 3-4, the materials were mixed to prepare the paint compositions No. 1 to No 8. The surface of the golf ball body obtained above was subjected to a sandblast treatment, and a mark was formed thereon. Then, the paint was applied to the golf ball body with a spray gun, and the paint was dried in an oven at 40° C. for 24 hours to obtain the golf ball having a diameter of 42.7 mm and a mass of 45.3 g. The paint film had a thickness of 18 μm. The golf ball body was placed in a rotating member shown in FIG. 4, the rotating member was allowed to rotate at 300 rpm, and application of the paint was conducted by spacing a spray distance (7 cm) between the air gun and the golf ball body while moving the air gun in an up and down direction. The painting interval in the overpainting operation was set to 1.0 second. Application of the paint was conducted under the air gun spraying conditions of a spraying air pressure: 0.15 MPa, a compressed air tank pressure: 0.10 MPa, a painting time for one application: 1 second, an atmosphere temperature: 20° C. to 27° C., and an atmosphere humidity: 65% or less. Results evaluating the spin performance of the obtained golf balls are shown in Tables 3-4. It is noted that the paint film was formed from each of the paints, and the results measuring the dynamic viscoelasticity of the paint film are shown in FIG. 5 to FIG. 12.

TABLE 3

| | | Golf ball No. | | | | | |
|---|---|---|---|---|---|---|---|
| | | 1 | 2 | 3 | 4 | 5 | 6 |
| Core composition No. | | A | A | A | A | A | A |
| Compression deformation amount of core (mm) | | 3.95 | 3.95 | 3.95 | 3.95 | 3.95 | 3.95 |
| Cover composition No. | | a | a | a | a | a | a |
| Material hardness of cover (Shore D) | | 60 | 60 | 60 | 60 | 60 | 60 |
| Paint formulation No. | | 1 | 2 | 3 | 4 | 5 | 6 |
| Base material Formulation (parts by mass) | Polyrotaxane | — | — | — | — | — | 50 |
| | Polycaprolactone polyol | — | — | — | — | — | 28 |
| | Modified product of vinyl chloride-vinyl acetate copolymer | — | — | — | — | — | 22 |
| | Solvent | — | — | — | — | — | 100 |
| | Polyn #950 | 100 | 100 | 100 | 100 | 100 | — |
| Curing agent formulation (parts by mass) | HDI biuret-modified product | 30 | 30 | 30 | 30 | 30 | — |
| | HDI isocyanurate | 30 | 30 | 30 | 30 | 30 | 50 |
| | IPDI isocyanurate | 40 | 40 | 40 | 40 | 40 | 50 |
| | Solvent | 100 | 100 | 100 | 100 | 100 | 100 |
| NCO/OH molar ratio of curing agent/base material | | 1.2/1.0 | 0.7/1.0 | 0.61/1.0 | 0.5/1.0 | 0.38/1.0 | 1.3/1.0 |
| 10% Elastic modulus of paint film (kgf/cm$^2$) | | 187 | 100 | 65 | 40 | 8 | 60 |

TABLE 3-continued

| | | | | | | |
|---|---|---|---|---|---|---|
| Storage modulus $E'_{120}$ at 120° C. of paint film (×$10^7$ Pa) | 1.3 | 0.8 | 0.5 | 0.4 | 0.2 | 1.6 |
| Storage modulus $E'_{150}$ at 150° C. of paint film (×$10^7$ Pa) | 1.1 | 0.8 | 0.5 | 0.4 | 0.2 | 1.6 |
| Peak temp. (° C.) of loss tangent (tan δ) of paint film | 88 | 72 | 68 | 60 | 52 | 56 |
| Peak height of loss tangent (tan δ) of paint film | 0.74 | 0.86 | 0.93 | 0.91 | 1.02 | 0.47 |
| Indentation depth of paint film (nm) | 390 | 1000 | 1500 | 1600 | 2950 | 1550 |
| Physical properties of golf ball | Spin rate on wet condition (rpm) | 2310 | 2380 | 2450 | 2520 | 2590 | 2520 |
| | Stain resistance | E | G | F | P | P | E |
| | Shot feeling on approach shots | P | F | G | G | E | G |
| | Resilience (Coefficient of restitution) | 0.785 | 0.785 | 0.785 | 0.786 | 0.786 | 0.786 |

| | | Golf ball No. | | | | | |
|---|---|---|---|---|---|---|---|
| | | 7 | 8 | 9 | 10 | 11 | 12 |
| Core composition No. | | A | A | A | A | A | A |
| Compression deformation amount of core (mm) | | 3.95 | 3.95 | 3.95 | 3.95 | 3.95 | 3.95 |
| Cover composition No. | | a | a | b | c | d | e |
| Material hardness of cover (Shore D) | | 60 | 60 | 57 | 50 | 44 | 40 |
| Paint formulation No. | | 7 | 8 | 8 | 8 | 8 | 8 |
| Base material Formulation (parts by mass) | Polyrotaxane | 50 | 50 | 50 | 50 | 50 | 50 |
| | Polycaprolactone polyol | 28 | 28 | 28 | 28 | 28 | 28 |
| | Modified product of vinyl chloride-vinyl acetate copolymer | 22 | 22 | 22 | 22 | 22 | 22 |
| | Solvent | 100 | 100 | 100 | 100 | 100 | 100 |
| | Polyn #950 | — | — | — | — | — | — |
| Curing agent formulation (parts by mass) | HDI biuret-modified product | — | — | — | — | — | — |
| | HDI isocyanurate | 50 | 70 | 70 | 70 | 70 | 70 |
| | IPDI isocyanurate | 50 | 30 | 30 | 30 | 30 | 30 |
| | Solvent | 100 | 100 | 100 | 100 | 100 | 100 |
| NCO/OH molar ratio of curing agent/base material | | 1.1/1.0 | 1.2/1.0 | 1.2/1.0 | 1.2/1.0 | 1.2/1.0 | 1.2/1.0 |
| 10% Elastic modulus of paint film (kgf/$cm^2$) | | 30 | 20 | 20 | 20 | 20 | 20 |
| Storage modulus $E'_{120}$ at 120° C. of paint film (× $10^7$ Pa) | | 1.3 | 1.7 | 1.7 | 1.7 | 1.7 | 1.7 |
| Storage modulus $E'_{150}$ at 150° C. of paint film (× $10^7$ Pa) | | 1.4 | 1.8 | 1.8 | 1.8 | 1.8 | 1.8 |
| Peak temp. (° C.) of loss tangent (tan δ) of paint film | | 48 | 44 | 44 | 44 | 44 | 44 |
| Peak height of loss tangent (tan δ) of paint film | | 0.53 | 0.56 | 0.56 | 0.56 | 0.56 | 0.56 |
| Indentation depth of paint film (nm) | | 1800 | 2200 | 2200 | 2200 | 2200 | 2200 |
| Physical properties of golf ball | Spin rate on wet condition (rpm) | 2590 | 2660 | 2765 | 2905 | 3010 | 3115 |
| | Stain resistance | G | G | G | G | G | G |
| | Shot feeling on approach shots | E | E | G | G | G | G |
| | Resilience (Coefficient of restitution) | 0.786 | 0.786 | 0.783 | 0.778 | 0.772 | 0.766 |

TABLE 4

| | Golf ball No. | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Core composition No. | A | A | A | A | A | A | A | A | B | C | D | E |
| Compression deformation amount of core (mm) | 3.95 | 3.95 | 3.95 | 3.95 | 3.95 | 3.95 | 3.95 | 3.95 | 4.25 | 4.45 | 3.45 | 3.15 |
| Cover composition No. | a | a | a | a | a | a | a | a | a | a | a | a |
| Compression deformation amount of golf ball body (mm) | 3.3 | 3.3 | 3.3 | 3.3 | 3.3 | 3.3 | 3.3 | 3.3 | 3.6 | 3.8 | 2.8 | 2.5 |
| Paint formulation No. | 1 | 2 | 3 | 4 | 5 | 6 | 7 | 8 | 8 | 8 | 8 | 8 |

TABLE 4-continued

| | | Golf ball No. | | | | | | | | | | | |
|---|---|---|---|---|---|---|---|---|---|---|---|---|
| | | 13 | 14 | 15 | 16 | 17 | 18 | 19 | 20 | 21 | 22 | 23 | 24 |
| Base material formulation (parts by mass) | Polyrotaxane | — | — | — | — | — | 50 | 50 | 50 | 50 | 50 | 50 | 50 |
| | Polycaprolactone polyol | — | — | — | — | — | 28 | 28 | 28 | 28 | 28 | 28 | 28 |
| | Modified product of vinyl chloride-vinyl acetate copolymer | — | — | — | — | — | 22 | 22 | 22 | 22 | 22 | 22 | 22 |
| | Solvent | — | — | — | — | — | 100 | 100 | 100 | 100 | 100 | 100 | 100 |
| | Polyn #950 | 100 | 100 | 100 | 100 | 100 | — | — | — | — | — | — | — |
| Curing agent formulation (parts by mass) | HDI biuret-modified product | 30 | 30 | 30 | 30 | 30 | — | — | — | — | — | — | — |
| | HDI isocyanurate | 30 | 30 | 30 | 30 | 30 | 50 | 50 | 70 | 70 | 70 | 70 | 70 |
| | IPDI isocyanurate | 40 | 40 | 40 | 40 | 40 | 50 | 50 | 30 | 30 | 30 | 30 | 30 |
| | Solvent | 100 | 100 | 100 | 100 | 100 | 100 | 100 | 100 | 100 | 100 | 100 | 100 |
| NCO/OH molar ratio of curing agent/base material | | 1.2/1.0 | 0.7/1.0 | 0.61/1.0 | 0.5/1.0 | 0.38/1.0 | 1.3/1.0 | 1.1/1.0 | 1.2/1.0 | 1.2/1.0 | 1.2/1.0 | 1.2/1.0 | 1.2/1.0 |
| 10% Elastic modulus of paint film (kgf/cm$^2$) | | 187 | 100 | 65 | 40 | 8 | 60 | 30 | 20 | 20 | 20 | 20 | 20 |
| Storage modulus $E'_{120}$ at 120° C. of paint film ($\times 10^7$ Pa) | | 1.3 | 0.8 | 0.5 | 0.4 | 0.2 | 1.6 | 1.3 | 1.7 | 1.7 | 1.7 | 1.7 | 1.7 |
| Storage modulus $E'_{150}$ at 150° C. of paint film ($\times 10^7$ Pa) | | 1.1 | 0.8 | 0.5 | 0.4 | 0.2 | 1.6 | 1.4 | 1.8 | 1.8 | 1.8 | 1.8 | 1.8 |
| Peak temperature of loss tangent (tan δ) of paint film (° C.) | | 88 | 72 | 68 | 60 | 52 | 56 | 48 | 44 | 44 | 44 | 44 | 44 |
| Peak height of loss tangent (tan δ) of paint film | | 0.74 | 0.86 | 0.93 | 0.91 | 1.02 | 0.47 | 0.53 | 0.56 | 0.56 | 0.56 | 0.56 | 0.56 |
| Indentation depth of paint film (nm) | | 390 | 1000 | 1500 | 1600 | 2950 | 1550 | 1800 | 2200 | 2200 | 2200 | 2200 | 2200 |
| Physical properties of golf ball | Wet paper spin rate (rpm) | 1650 | 1700 | 1750 | 1800 | 1850 | 1800 | 1850 | 1900 | 1925 | 1850 | 2150 | 2200 |
| | Stain resistance | E | G | F | P | P | E | G | G | G | G | G | G |
| | Shot feeling on approach shots | P | F | G | G | E | G | E | E | E | E | G | F |
| | Shot feeling on driver shots | G | G | G | G | G | G | G | G | G | E | P | P |

The raw materials used in Tables 3-4 are shown below.

Base Material

Polyrotaxane: "SeRM (registered trademark) super polymer SH3400P (a polyrotaxane having a cyclodextrin, at least a part of hydroxyl groups of the cyclodextrin being modified with a caprolactone chain via a —O—C$_3$H$_6$—O— group, a linear molecule of polyethylene glycol and a blocking group of an adamantyl group; the molecular weight of the linear molecule: 35,000; the hydroxyl value of the polyrotaxane: 72 mg KOH/g; the total molecular weight of the polyrotaxane: 700,000 in a weight average molecular weight)" available from Advanced Softmaterials Inc.

Polycaprolactone polyol: Placcel 308 available from Daicel Chemical Industries, Ltd.

Modified product of vinyl chloride-vinyl acetate copolymer: Solbin AL (hydroxyl-modified vinyl chloride-vinyl acetate copolymer) available from Nissin Chemical Industry Co., Ltd.

Modified silicone: DBL-C31 available from Gelest, Inc.

Solvent: mixed solvent of xylene/methylethyl ketone=70/30 (mass ratio)

Polin #950: urethane polyol having a hydroxyl value of 128 mg KOH/g and formed from a polyol component (trimethylolpropane and polyoxytetramethylene glycol) and a polyisocyanate component (isophorone diisocyanate), available from Shinto Paint Co., Ltd.

Curing Agent

Isocyanurate of hexamethylene diisocyanate (HDI isocyanurate): Duranate TKA-100 (NCO content: 21.7%) available from Asahi Kasei Chemicals Corporation Biuret-modified product of hexamethylene diisocyanate (HDI biuret-modified product): Duranate 21S-75E (NCO content: 15.5%) available from Asahi Kasei Chemicals Corporation Isocyanurate of isophorone diisocyanate (IPDI isocyanurate): VESTANAT T1890 (NCO content: 12.0%) available from Degussa Co., Ltd.

Solvent: Methylethyl Ketone

The golf ball according to the present invention is a golf ball comprising a golf ball body having a cover, and a paint film covering the golf ball body, wherein a 10% elastic modulus of the paint film is 75 kgf/cm$^2$ or less, a storage modulus ($E'_{150}$) at 150° C. of the paint film obtained by measuring dynamic viscoelasticity of the paint film is 1.0×10$^7$ Pa or more, an indentation depth of the paint film measured with a nanoindenter in a state that the paint film is formed on the surface of the golf ball body is 1250 nm or more, and a material hardness of the cover is 50 or less in Shore D hardness. It can be seen from the results shown in Table 3 that the golf ball according to the present invention travels a great flight distance on driver shots (i.e. has a large coefficient of restitution), and has an increased spin rate on approach shots under a wet condition and thus is excellent in controllability. Further, the golf ball according to the present invention is excellent in stain resistance and shot feeling.

The golf ball according to the present invention is a golf ball comprising a golf ball body and a paint film covering the golf ball body, wherein a 10% elastic modulus of the paint film is 75 kgf/cm$^2$ or less, a storage modulus ($E'_{150}$) at 150° C. of the paint film obtained by measuring dynamic viscoelasticity of the paint film is $1.0 \times 10^7$ Pa or more, an indentation depth of the paint film measured with a nanoindenter in a state that the paint film is formed on the surface of the golf ball body is 1250 nm or more, a diameter of the golf ball ranges from 40 mm to 45 mm, and a compression deformation amount of the golf ball when applying a load from 98 N as an initial load to 1275 N as a final load to the golf ball is more than 3.0 mm. It can be seen from the results shown in Table 4 that the golf ball according to the present invention has a good shot feeling on driver shots, and has an increased spin rate on approach shots from the rough and thus is excellent in controllability. Further, the golf ball according to the present invention is excellent in stain resistance and shot feeling.

The present invention is suitably useful for painted golf balls.

This application is based on Japanese patent application No. 2017-229721 filed on Nov. 29, 2017, Japanese patent application No. 2017-229722 filed on Nov. 29, 2017, and Japanese patent application No. 2018-180087 filed on Sep. 26, 2018, the contents of which are hereby incorporated by reference.

The invention claimed is:

1. A golf ball comprising a golf ball body having a cover, and a paint film covering the golf ball body, wherein
   a 10% elastic modulus of the paint film is 75 kgf/cm$^2$ or less,
   a storage modulus ($E'_{150}$) at 150° C. of the paint film obtained by measuring dynamic viscoelasticity of the paint film is more than $1.0 \times 10^7$ Pa,
   an indentation depth of the paint film measured with a nanoindenter in a state that the paint film is formed on the surface of the golf ball body is 1250 nm or more, and
   a material hardness of the cover is 50 or more in Shore D hardness,
   the paint film contains a polyurethane as a resin component, wherein the polyurethane comprises, as a constituent component, (A) a polyisocyanate component and (B) a polyol component containing a polyrotaxane,
   (A) the polyisocyanate component consists of an isocyanurate of hexamethylene diisocyanate and an isocyanurate of isophorone diisocyanate, and
   a mixing ratio (HDI isocyanurate/IPDI isocyanurate) of the isocyanurate of hexamethylene diisocyanate to the isocyanurate of isophorone diisocyanate ranges from 45/55 to 90/10 in a mass ratio.

2. The golf ball according to claim 1, wherein a loss tangent tan δ of the paint film obtained by measuring dynamic viscoelasticity of the paint film has a peak temperature of 60° C. or less.

3. The golf ball according to claim 1, wherein a storage modulus ($E'_{120}$) at 120° C. of the paint film is $1.0 \times 10^7$ Pa or more.

4. The golf ball according to claim 1, wherein the 10% elastic modulus of the paint film is 2 kgf/cm$^2$ or more.

5. The golf ball according to claim 1, wherein the polyurethane is a reaction product obtained under a reaction condition that a molar ratio of an isocyanate group (NCO) of (A) the polyisocyanate component to a hydroxyl group (OH) of (B) the polyol component is 0.95 or more and 2.0 or less.

6. The golf ball according to claim 1, wherein the polyrotaxane comprises a cyclodextrin, a linear molecule piercing through the cyclic structure of the cyclodextrin, and blocking groups located at both terminals of the linear molecule to prevent disassociation of the cyclodextrin, wherein at least a part of the cyclodextrin hydroxyl groups is modified with a caprolactone chain via a —O—C$_3$H$_6$—O— group.

7. The golf ball according to claim 6, wherein the linear molecule of the polyrotaxane is polyethylene glycol, and the blocking group of the polyrotaxane is an adamantyl group.

8. The golf ball according to claim 1, wherein (B) the polyol component contains the polyrotaxane in an amount ranging from 10 mass % to 100 mass %.

9. The golf ball according to claim 1, wherein
   the storage modulus ($E'_{150}$) at 150° C. of the paint film obtained by measuring dynamic viscoelasticity of the paint film is $1.2 \times 10^7$ Pa or more.

10. The golf ball according to claim 1, wherein the golf ball has a color difference of 20 or less based on $\Delta E = [(\Delta L)^2 + (\Delta a)^2 + (\Delta b)^2]^{1/2}$ and determined by a following method:
    immersing the golf ball for 30 seconds in an aqueous solution of tincture of iodine,
    wiping off the extra aqueous solution of tincture of iodine adhered on the surface of the golf ball that is taken out from the aqueous solution, and
    measuring color tones (L, a, b) of the golf ball before and after the immersion using a color difference meter.

11. The golf ball according to claim 1, wherein the polyurethane comprises, as a constituent component, a polyamine component.

12. A golf ball comprising a golf ball body and a paint film covering the golf ball body, wherein
    a 10% elastic modulus of the paint film is 75 kgf/cm$^2$ or less, a storage modulus ($E'_{150}$) at 150° C. of the paint film obtained by measuring dynamic viscoelasticity of the paint film is more than $1.0 \times 10^7$ Pa,
    an indentation depth of the paint film measured with a nanoindenter in a state that the paint film is formed on the surface of the golf ball body is 1250 nm or more,
    a diameter of the golf ball ranges from 40 mm to 45 mm, and
    a compression deformation amount of the golf ball when applying a load from 98 N as an initial load to 1275 N as a final load to the golf ball is more than 3.0 mm,
    the paint film contains a polyurethane as a resin component, wherein the polyurethane comprises, as a constituent component, (A) a polyisocyanate component and (B) a polyol component containing a polyrotaxane,
    (A) the polyisocyanate component consists of an isocyanurate of hexamethylene diisocyanate and an isocyanurate of isophorone diisocyanate, and
    a mixing ratio (HDI isocyanurate/IPDI isocyanurate) of the isocyanurate of hexamethylene diisocyanate to the isocyanurate of isophorone diisocyanate ranges from 45/55 to 90/10 in a mass ratio.

13. The golf ball according to claim 12, wherein a loss tangent tan δ of the paint film obtained by measuring dynamic viscoelasticity of the paint film has a peak temperature of 60° C. or less.

14. The golf ball according to claim 12, wherein a storage modulus ($E'_{120}$) at 120° C. of the paint film is $1.0 \times 10^7$ Pa or more.

15. The golf ball according to claim 12, wherein the 10% elastic modulus of the paint film is 2 kgf/cm$^2$ or more.

16. The golf ball according to claim 12, wherein the polyurethane is a reaction product obtained under a reaction condition that a molar ratio of an isocyanate group (NCO) of (A) the polyisocyanate component to a hydroxyl group (OH) of (B) the polyol component is 0.95 or more and 2.0 or less.

17. The golf ball according to claim 12, wherein the polyrotaxane comprises a cyclodextrin, a linear molecule piercing through the cyclic structure of the cyclodextrin, and blocking groups located at both terminals of the linear molecule to prevent disassociation of the cyclodextrin, wherein at least a part of the cyclodextrin hydroxyl groups is modified with a caprolactone chain via a —O—$C_3H_6$—O— group.

18. The golf ball according to claim 17, wherein the linear molecule of the polyrotaxane is polyethylene glycol, and the blocking group of the polyrotaxane is an adamantyl group.

19. The golf ball according to claim 12, wherein (B) the polyol component contains the polyrotaxane in an amount ranging from 10 mass % to 100 mass %.

20. The golf ball according to claim 12, wherein
the storage modulus ($E'_{150}$) at 150° C. of the paint film obtained by measuring dynamic viscoelasticity of the paint film is $1.2 \times 10^7$ Pa or more.

21. The golf ball according to claim 12, wherein the golf ball has a color difference of 20 or less based on $\Delta E = [(\Delta L)^2 + (\Delta a)^2 + (\Delta b)^2]^{1/2}$ and determined by a following method:
immersing the golf ball for 30 seconds in an aqueous solution of tincture of iodine,
wiping off the extra aqueous solution of tincture of iodine adhered on the surface of the golf ball that is taken out from the aqueous solution, and
measuring color tones (L, a, b) of the golf ball before and after the immersion using a color difference meter.

22. The golf ball according to claim 12, wherein the polyurethane comprises, as a constituent component, a polyamine component.

\* \* \* \* \*